(12) United States Patent
Liu et al.

(10) Patent No.: US 12,010,759 B2
(45) Date of Patent: Jun. 11, 2024

(54) METHOD FOR PROCESSING CHANGE IN RADIO CAPABILITY OF TERMINAL APPARATUS AND APPARATUS

(71) Applicant: Huawei Technologies Co., Ltd., Shenzhen (CN)

(72) Inventors: Ruizhi Liu, Shenzhen (CN); Wanqiang Zhang, Beijing (CN); Zhenglei Huang, Beijing (CN); Haiyang Sun, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 57 days.

(21) Appl. No.: 17/176,381

(22) Filed: Feb. 16, 2021

(65) Prior Publication Data

US 2021/0185513 A1    Jun. 17, 2021

Related U.S. Application Data

(63) Continuation of application No. PCT/CN2019/100225, filed on Aug. 12, 2019.

(30) Foreign Application Priority Data

Aug. 13, 2018 (CN) .......................... 201810918770.2

(51) Int. Cl.
*H04W 8/24* (2009.01)
*H04W 8/18* (2009.01)
(Continued)

(52) U.S. Cl.
CPC ............. *H04W 8/24* (2013.01); *H04W 76/10* (2018.02); *H04W 76/27* (2018.02)

(58) Field of Classification Search
None
See application file for complete search history.

(56) References Cited

U.S. PATENT DOCUMENTS

2007/0264994 A1    11/2007  Schwarz et al.
2014/0235221 A1*   8/2014   Fang ................. H04W 52/0212
                                                              455/418
(Continued)

FOREIGN PATENT DOCUMENTS

CN          101730058 A       6/2010
CN          101889458 A       11/2010
(Continued)

OTHER PUBLICATIONS

Huawei, HiSilicon, "Solution for UE radio capabilities changed," 3GPP TSG-SA WG2 Meeting #129, Dongguan, People's Republic of China, S2-1810723, total 3 pages, 3rd Generation Partnership Project, Valbonne, France (Oct. 15-19, 2018).

(Continued)

*Primary Examiner* — Gary Lafontant
(74) *Attorney, Agent, or Firm* — Leydig, Voit & Mayer, Ltd.

(57) ABSTRACT

This application provides a method for processing a change in a radio capability of a terminal apparatus and an apparatus. The method includes: receiving, by an access network apparatus, indication information, where the access network apparatus stores radio capability information of a terminal apparatus, and the indication information is used to indicate that a radio capability of the terminal apparatus changes, or is used to request a current radio capability of the terminal apparatus from the access network apparatus; and obtaining, by the access network apparatus, radio capability information of the terminal apparatus according to the indication information. According to this application, communication efficiency of a radio control resource connection performed when a radio capability of the UE changes in a suspend state can be improved.

9 Claims, 14 Drawing Sheets

(51) Int. Cl.
*H04W 76/10* (2018.01)
*H04W 76/27* (2018.01)

(56) References Cited

U.S. PATENT DOCUMENTS

| | | | |
|---|---|---|---|
| 2015/0312787 A1 | 10/2015 | Das et al. | |
| 2018/0139778 A1 | 5/2018 | Chou et al. | |
| 2018/0146365 A1* | 5/2018 | Dhanapal | H04W 8/183 |
| 2020/0077431 A1* | 3/2020 | Tang | H04W 72/20 |

FOREIGN PATENT DOCUMENTS

| | | |
|---|---|---|
| CN | 106961653 A | 7/2017 |
| CN | 106961712 A | 7/2017 |
| CN | 106961747 A | 7/2017 |
| JP | 2011530897 A | 12/2011 |
| JP | 2014099878 A | 5/2014 |
| KR | 20110039580 A | 4/2011 |
| KR | 101550577 B1 | 9/2015 |
| RU | 2407193 C2 | 12/2010 |
| WO | 2017133565 A1 | 8/2017 |

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 15)," 3GPP TS 23.401 V15.4.0, total 410 pages, 3rd Generation Partnership Project, Valbonne, France (Jun. 2018).

"3rd Generation Partnership Project;Technical Specification Group Services and System Aspects;System Architecture for the 5G System; Stage 2 (Release 15)," 3GPP TS 23.501 V15.2.0, total 217 pages, 3rd Generation Partnership Project, Valbonne, France (Jun. 2018).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.2.0, total 357 pages, 3rd Generation Partnership Project, Valbonne, France (Jun. 2018).

Intel et al., "UE Radio Capability Update using TAU procedure," 3GPP TSG-CT WG1 Meeting #111, Osaka, Japan, C1-183817, total 9 pages, 3rd Generation Partnership Project, Valbonne, France (May 21-25, 2018).

Intel, "UE Radio Capability Update using TAU procedure," SA WG2 Meeting #128, Vilnius, Lithuania, S2-187228, total 6 pages (Jul. 2-6, 2018).

Intel, "UE Radio Capability Update using TAU procedure," SA WG2 Meeting #128, Vilnius, Lithuania, S2-187596, total 6 pages (Jul. 2-6, 2018).

"3rd Generation Partnership Project; Technical Specification Group Core Network and Terminals;Mobile radio interface Layer 3 specification;Core network protocols; Stage 3 (Release 15)," 3GPP TS 24.008 V15.3.0, total 788 pages, 3rd Generation Partnership Project, Valbonne, France (Jun. 2018).

"3rd Generation Partnership Project;Technical Specification Group Radio Access Network;Evolved Universal Terrestrial Radio Access (E-UTRA);Radio Resource Control (RRC);Protocol specification (Release 15)," 3GPP TS 36.331 V15.2.2, total 791 pages, 3rd Generation Partnership Project, Valbonne, France (Jun. 2018).

Qualcomm Europe, "UE capability updates while attached," 3GPP TSG-RAN WG2 #63, Jeju Island, Korea, R2-083878, total 5 pages, 3rd Generation Partnership Project, Valbonne, France (Aug. 18-22, 2008).

Qualcomm Incorporated, "UE capability change in RRC_Inactive," 3GPP TSG-RAN WG2 #103 meeting, Gothenburg, Sweden, R2-1811141, total 4 pages, 3rd Generation Partnership Project, Valbonne, France (Aug. 20-24, 2018).

Qualcomm Incorporated, "Change of UE radio capability information in EMM-IDLE mode with suspend indication," 3GPP TSG CT WG1 Meeting #112, West Palm Beach, FL (USA), C1-185166, C1-185166, total 3 pages, 3rd Generation Partnership Project, Valbonne, France (Aug. 20-24, 2018).

JP/2021-507561, Office Action, dated Nov. 22, 2022.

* cited by examiner

METHOD FOR PROCESSING CHANGE IN RADIO CAPABILITY OF TERMINAL APPARATUS AND APPARATUS

CROSS-REFERENCE TO RELATED APPLICATIONS

This application is a continuation of International Application No. PCT/CN2019/100225, filed on Aug. 12, 2019, which claims priority to Chinese Patent Application No. 201810918770.2, filed on Aug. 13, 2018. The disclosures of the aforementioned applications are hereby incorporated by reference in their entireties.

TECHNICAL FIELD

Embodiments of this application relate to the field of communications technologies, and more specifically, to a method for processing a change in a radio capability of a terminal apparatus and an apparatus.

BACKGROUND

To better support a cellular internet of things (CIoT) device, a user plane transmission enhancement technology is introduced. When UE and a network support a user plane optimization data transmission scheme, the network suspends an established connection by using a connection suspend ( ) procedure. In the connection suspend procedure, a context of the UE and a context of a bearer are stored, and the UE enters an idle state. In this case, when the UE needs to send data, the UE may quickly resume a connection by using a connection resume procedure, to enter a connected state, without initiating a service request procedure.

In a radio resource suspend (RRC suspend) state, when the UE is in the idle state, a radio capability of the UE may change, but a context retained on an access network apparatus is a context before the radio capability of the UE changes. When the UE resumes the connection, the access network apparatus resumes a radio resource based on the context retained before the radio capability of the UE changes. Consequently, a failure may be caused to the resumption of the radio resource. Alternatively, if the access network apparatus successfully resumes a radio resource based on the context retained before the radio capability of the UE changes, the access network apparatus needs to delete the context stored by the access network apparatus before the radio capability of the UE changes. However, currently in a current suspend/resume mechanism, a core network apparatus does not instruct the access network apparatus to delete the context of the UE. Therefore, a problem of abnormal communication and efficiency reduction that are caused by the change in the radio capability of the UE in a suspend state needs to be resolved.

SUMMARY

This application provides a method for processing a change in a radio capability of a terminal apparatus and an apparatus, to update a radio capability of the UE, and release a resource occupied by a context that is stored in an access network apparatus and that is before the radio capability of the UE changes, thereby avoiding abnormal communication and improving communication efficiency.

According to a first aspect, a method for processing a change in a radio capability of a terminal apparatus is provided. The method includes:

receiving, by an access network apparatus, indication information, where the access network apparatus stores radio capability information of a terminal apparatus, and the indication information is used to indicate that a radio capability of the terminal apparatus changes, or is used to request a current radio capability of the terminal apparatus from the access network apparatus; and obtaining, by the access network apparatus, current radio capability information of the terminal apparatus according to the indication information.

In this embodiment of this application, when a radio capability of the UE in a suspend state changes, the access network apparatus requests the current radio capability of the terminal apparatus according to the indication information, so that the terminal apparatus can successfully resume a radio resource connection, thereby improving communication efficiency.

It should be noted that, the radio capability of the terminal apparatus already stored in the access network apparatus may be a first radio capability of the terminal apparatus, to be specific, radio capability information in a context of the UE that is stored when the terminal apparatus enters the suspend state or a radio resource control inactive (RRC Inactive) state. The access network apparatus receives the indication information. The indication information indicates that the radio capability of the terminal apparatus changes, that is, the indication information may indicate a change in the radio capability of the terminal apparatus. Alternatively, the indication information instructs the access network apparatus to update or request the radio capability of the terminal apparatus, that is, instructs the access network apparatus to update the first radio capability of the terminal apparatus or request the current radio capability of the terminal apparatus. The first radio capability may include radio access technology information supported by the terminal apparatus, for example, information such as an energy level and a frequency band.

It should be understood that, that the access network apparatus processes first radio capability information in the access network apparatus may be that the access network apparatus updates the first radio capability information, or may be that the access network apparatus deletes the first radio capability information.

With reference to the first aspect, in some implementations of the first aspect, the receiving, by an access network apparatus, indication information includes:

receiving, by the access network apparatus, a first message sent by the terminal apparatus, where the first message is used to request to resume a radio resource of the terminal apparatus in a suspend state, and the first message includes the indication information.

For example, the first message may be a radio resume request (RRC connection resume request) message in a radio resource resume (RRC Resume) procedure, or may be another message sent by the terminal apparatus to the access network apparatus in a radio resource resume procedure.

With reference to the first aspect, in some implementations of the first aspect, the receiving, by an access network apparatus, indication information includes:

receiving, by the access network apparatus, a first message sent by the terminal apparatus, where the first message is used to request to resume a radio resource of the terminal apparatus in a suspend state, and the first message includes the indication information.

For example, the second message may be a radio resume complete (RRC connection resume complete) message in a radio resource resume (RRC Resume) procedure, or may be another message sent by the terminal apparatus to the access network apparatus in a radio resource resume procedure.

With reference to the first aspect, in some implementations of the first aspect, the receiving, by an access network apparatus, indication information includes:

receiving, by the access network apparatus, a third message sent by the terminal apparatus, where the third message is used to indicate that a radio resource control connection is established, and the third message includes identification information used for resuming radio resource control.

For example, the third message may be a radio resource control connection establishment complete message in a radio resource control connection establishment procedure, or another message in a radio resource control connection establishment procedure. It should be understood that, in this embodiment of this application, the access network apparatus receives the indication information sent by the terminal apparatus, where the indication information may be information used to indicate that a first radio capability of the terminal apparatus changes, or the indication information may be information used to instruct the access network apparatus to update first radio capability information of the terminal apparatus. A first radio capability may include radio access technology information supported by the terminal apparatus, for example, information such as an energy level and a frequency band.

With reference to the first aspect, in some implementations of the first aspect, the receiving, by an access network apparatus, indication information includes:

receiving, by the access network apparatus, the indication information sent by a core network apparatus, where the indication information is used to indicate that the radio capability of the terminal apparatus changes; and updating, by the access network apparatus according to the indication information, the radio capability information stored by the access network apparatus.

With reference to the first aspect, in some implementations of the first aspect, when the indication information is used to request the current radio capability of the terminal apparatus from the access network apparatus, the method further includes:

sending, by a core network apparatus, the indication information, and receiving, by the access network apparatus, an update indication, where the update indication is used to instruct the access network apparatus to update the radio capability information of the terminal apparatus.

With reference to the first aspect, in some implementations of the first aspect, the receiving, by an access network apparatus, indication information includes:

receiving, by the access network apparatus, a fourth message sent by a core network apparatus, where the fourth message includes the indication information.

For example, the access network apparatus receives the fourth message sent by the core network apparatus. The fourth message is used to instruct the access network apparatus to delete or update the first radio capability information in the access network apparatus. The fourth message includes the indication information. The core network apparatus is a mobility management entity or an access and mobility management function entity.

Optionally, the fourth message may be a new message used by the core network apparatus to indicate that the access network apparatus needs to delete or update a stored old context of the UE.

Optionally, the fourth message may be an existing message used by the core network apparatus to indicate that the access network apparatus needs to delete or update a stored old context of the UE.

For example, the core network apparatus instructs, by adding an information element to a connection establishment indication message, the access network apparatus to delete or update the old context of the UE.

Optionally, the fourth message may be a downlink non-access stratum (downlink NAS transport) message or a terminal apparatus transfer (UE information transfer) message sent by the core network apparatus to the access network apparatus, to indicate that the access network apparatus needs to update or delete a stored old context of the UE.

It should be understood that, in this embodiment of this application, the access network apparatus receives the indication information sent by the terminal apparatus. The indication information may be used to indicate that a first radio capability of the terminal apparatus changes, or the indication information may be used to instruct the access network apparatus to update first radio capability information of the terminal apparatus, or the indication information may be used to instruct the access network apparatus to delete first radio capability information of the terminal apparatus. A first radio capability may indicate a radio access technology supported by the terminal apparatus, for example, information such as an energy level and a frequency band.

With reference to the first aspect, in some implementations of the first aspect, when the indication information is used to request the current radio capability of the terminal apparatus from the access network apparatus, the method further includes: receiving, by the access network apparatus, an update indication, where the update indication is used to instruct the access network apparatus to update the radio capability information of the terminal apparatus.

Optionally, the update indication and the indication information are carried in a same message.

With reference to the first aspect, in some implementations of the first aspect, after the access network apparatus requests the radio capability from the terminal apparatus according to the indication information, the method further includes:

receiving, by the access network apparatus, the radio capability information from the terminal apparatus, where the radio capability information indicates the current radio capability of the terminal apparatus.

For example, the access network apparatus sends a radio capability request message to the terminal apparatus according to the indication information, and the access network apparatus updates the first radio capability information based on a second radio capability. The second radio capability is the current radio capability of the terminal apparatus.

For example, the access network apparatus requests the radio capability of the UE from the terminal apparatus according to the indication information. The indication information may be considered as a trigger condition for requesting the radio capability of the UE. After receiving the radio capability request, the terminal apparatus reports the current radio capability of the UE, for example, a second radio capability, to the access network apparatus. The access network apparatus may update, based on the second radio capability, context information of a first radio capability that is retained in the access network apparatus, and report updated context information of the radio capability to the core network apparatus.

It should be understood that, updating the first radio capability information may be updating a part of the first radio capability information or may be updating all of the radio capability information.

With reference to the first aspect, in some implementations of the first aspect, the method further includes:

deleting, by the access network apparatus, the radio capability stored before the access network apparatus requests the radio capability from the terminal apparatus.

For example, the access network apparatus sends a radio capability request message to the terminal apparatus according to the indication information. The second radio capability is the current radio capability of the terminal apparatus. The access network apparatus deletes the first radio capability information based on the second radio capability. The second radio capability is the current radio capability of the terminal apparatus.

For example, the access network apparatus requests the radio capability of the UE from the terminal apparatus according to the indication information. The indication information may be considered as a trigger condition for requesting the radio capability of the UE. After receiving the radio capability request, the terminal apparatus reports the current radio capability of the UE, for example, a second radio capability, to the access network apparatus. The access network apparatus may delete, based on the second radio capability, context information of a first radio capability that is retained in the access network apparatus.

With reference to the first aspect, in some implementations of the first aspect, the terminal apparatus is in a radio resource suspend state or a radio resource inactive (RRC Inactive) state. It should be understood that, when the terminal apparatus is in the RRC suspend state or the RRC inactive state, a first radio capability changes. When resuming a radio resource connection, the terminal apparatus sends the indication information to the access network apparatus or the core network apparatus. The access network apparatus may process, according to the indication information, an old context of the UE retained in the access network apparatus. The old context may be a context of the UE before the radio capability changes.

With reference to the first aspect, in some implementations of the first aspect, the first radio capability includes a radio access technology supported by the terminal apparatus.

With reference to the first aspect, in some implementations of the first aspect, the radio capability includes at least one of system information or a transceiving capability supported by the terminal apparatus.

For example, the system information may include version information or frequency band information.

According to a second aspect, a method for processing a change in a radio capability of a terminal apparatus is provided. The method includes:

receiving, by an access network apparatus, radio resource control resume identification information, where the access network apparatus stores radio capability information of a terminal apparatus, and the radio resource control resume identification information is used to identify a context of the UE stored in the access network apparatus; and processing, by the access network apparatus, the context of the terminal apparatus in the access network apparatus based on the identification information.

In this embodiment of this application, when the radio capability of the UE in a suspend state or an RRC inactive state changes, or when the radio capability of the terminal changes in a case of storing AS information, the terminal apparatus initiates a conventional radio resource connection establishment procedure (RRC connection establishment), and the access network apparatus processes, based on the identification information, context information of the terminal apparatus that is retained in the access network apparatus, so that the terminal apparatus can successfully resume a radio resource connection, thereby improving communication efficiency.

It should be understood that, the radio capability of the UE stored in the access network apparatus is a first radio capability. The radio capability of the UE changes, and the access network apparatus receives the radio resource control resume identification information, and processes the context of the terminal apparatus in the access network apparatus based on the identification information.

With reference to the second aspect, in some implementations of the second aspect, the processing, by the access network apparatus, the context of the terminal apparatus in the access network apparatus based on the identification information includes:

deleting, by the access network apparatus, the radio capability stored before the access network apparatus requests the radio capability from the terminal apparatus; or sending, by the access network apparatus, an indication message, where the indication message is used to instruct a second access network apparatus to delete the context of the terminal apparatus, and the second access network apparatus is an access network apparatus accessed by the terminal apparatus when the terminal apparatus enters the suspend state.

It should be understood that the terminal apparatus may move to coverage of a new access network apparatus, namely, a first access network apparatus, when the terminal apparatus is in the suspend state, and initiate a conventional radio resource connection establishment procedure (RRC connection establishment) without needing to retain the context information in the access network device. Therefore, the access network apparatus needs to delete the retained context information of the UE, to release a resource.

With reference to the second aspect, in some implementations of the second aspect, the method further includes:

receiving, by the access network apparatus, a third message sent by the terminal apparatus, where the third message is used to indicate that radio resource control connection establishment is completed, and the third message includes the indication information.

For example, the third message may be a radio resource connection establishment complete message in a radio resource connection establishment procedure, or another message in a radio resource connection establishment procedure.

In this embodiment of this application, the UE may directly initiate an RRC connection establishment procedure rather than initiating an RRC resume procedure, thereby avoiding a failure of the RRC resume procedure caused by the change in the radio capability. In addition, an UE capability changed indication is carried in an RRC establishment message, so that the access network apparatus and a core network apparatus can learn of the change in the radio capability of the UE earlier, and a TAU procedure does not need to be performed to notify the change. Radio resource resume identification (Resume ID) information is carried in the RRC connection establishment procedure, to instruct the access network apparatus to delete the corresponding context of the UE.

With reference to the second aspect, in some implementations of the second aspect, the method further includes:
sending, by the access network apparatus, a radio capability request of the UE to the terminal apparatus according to the indication information; and receiving, by the access network apparatus, the radio capability of the UE that is reported by the terminal apparatus.

For example, the access network apparatus requests the radio capability of the UE from the terminal apparatus according to the indication information. The indication information may be considered as a trigger condition for requesting the radio capability of the UE. After receiving the radio capability request, the terminal apparatus reports the current radio capability of the UE, for example, a second radio capability, to the access network apparatus.

According to a third aspect, a method for processing a change in a radio capability of a terminal apparatus is provided. The method includes:
sending, by a terminal apparatus, indication information to an access network apparatus, where the indication information indicates that a radio capability of the terminal apparatus changes, or instructs the access network apparatus to update a radio capability of the terminal apparatus.

In this embodiment of this application, when the radio capability of the UE in a suspend state or an RRC inactive state changes, the access network apparatus processes, according to the indication information, context information of the radio capability of the terminal apparatus that is retained in the access network apparatus, so that the terminal apparatus can successfully resume a radio resource connection, thereby improving communication efficiency.

For example, the terminal apparatus sends the indication information to the access network apparatus. The indication information is information used to indicate that the first radio capability changes, or is information used to instruct the access network apparatus to update first radio capability information of the terminal apparatus. The first radio capability indicates a radio access technology supported by the terminal apparatus before the radio capability of the terminal apparatus changes.

It should be understood that before the terminal apparatus sends the indication information, the terminal apparatus may generate the indication information or determine the indication information.

With reference to the third aspect, in some implementations of the third aspect, the sending, by a terminal apparatus, indication information to an access network apparatus includes:
sending, by the terminal apparatus, a first message to the access network apparatus, where the first message is used to request to resume a radio resource of the terminal apparatus in a suspend state, and the first message includes the indication information.

For example, the first message may be a radio resume request (RRC connection resume request) message in a radio resource resume (RRC Resume) procedure, or may be another message sent by the terminal apparatus to the access network apparatus in a radio resource resume procedure.

With reference to the third aspect, in some implementations of the third aspect, the method further includes:
sending, by the terminal apparatus, a second message to the access network apparatus, where the second message is used to instruct the terminal apparatus to complete resume of a radio resource of the terminal apparatus in a suspend state, and the second message includes the indication information.

For example, the second message may be a radio resume complete (RRC connection resume complete) message in a radio resource resume (RRC Resume) procedure, or may be another message sent by the terminal apparatus to the access network apparatus in a radio resource resume procedure.

With reference to the third aspect, in some implementations of the third aspect, the sending, by a terminal apparatus, indication information to an access network apparatus includes:
sending, by the terminal apparatus, a third message to the access network apparatus, where the third message is used to indicate that a radio resource control connection is established, and the third message includes the identification information.

For example, the third message may be a radio resource connection establishment complete message in a radio resource connection establishment procedure, or another message in a radio resource connection establishment procedure.

It should be understood that, in this embodiment of this application, the access network apparatus receives the indication information sent by the terminal apparatus, where the indication information may be information used to indicate that a first radio capability of the terminal apparatus changes, or the indication information may be information used to instruct the access network apparatus to update first radio capability information of the terminal apparatus. The first radio capability may indicate a radio access technology supported by the terminal apparatus, for example, information such as an energy level and a frequency band.

With reference to the third aspect, in some implementations of the third aspect, at the time of the sending, by the terminal apparatus, a first message to the access network apparatus, the method further includes:
resuming, by the terminal apparatus, security of a signaling radio bearer and an access stratum, and skipping resuming a data radio bearer.

For example, a first radio capability changes when the terminal apparatus is in the suspend state. The terminal apparatus sends the indication information to the access network apparatus. When the terminal apparatus receives a radio resource connection resume (RRC connection resume) response of the access network apparatus, the terminal apparatus may simultaneously resume security of all of the SRB, the DRB, and the AS, and the UE enters an RRC connected state. Alternatively, the terminal apparatus may resume security of the SRB and the AS, and the UE does not establish the DRB temporarily.

With reference to the third aspect, in some implementations of the third aspect, the method further includes:
receiving, by the terminal apparatus, a data radio bearer configuration sent by the access network apparatus; and
resuming, by the terminal apparatus, security of the data radio bearer based on the data radio bearer configuration.

It should be noted that, when the terminal apparatus resumes security of an SRB and an AS, and the UE does not establish a DRB temporarily, the access network apparatus configures a DRB configuration of the UE based on the current radio capability of the UE and a status of a base station. In this case, the UE resumes a DRB, and the UE enters an RRC connected state.

For example, the terminal apparatus may resume security of an SRB and an AS, and the UE does not establish a DRB temporarily, the access network apparatus sends a radio capability request of the UE to the terminal apparatus. The terminal apparatus reports the radio capability of the UE, such as a second radio capability, to the access network apparatus. The access network apparatus configures a DRB of the UE based on the second radio capability and a status of the access network, and the UE resumes the DRB based on the DRB configured by the access network apparatus.

According to a fourth aspect, a method for processing a change in a radio capability of a terminal apparatus is provided. The method includes:

initiating, by a terminal apparatus, a radio resource control connection establishment message based on that the terminal apparatus is in a suspend state and a radio capability of the terminal apparatus changes, or that the terminal apparatus is in a radio resource control inactive state and a radio capability of the terminal apparatus changes.

In this embodiment of this application, when the radio capability of the UE in the suspend state changes, the terminal apparatus initiates a conventional radio resource connection establishment (RRC connection establishment) procedure, and an access network apparatus processes, based on identification information, context information of the terminal apparatus that is retained in the access network apparatus, so that the terminal apparatus can successfully resume a radio resource connection, thereby improving communication efficiency.

With reference to the fourth aspect, in some implementations of the fourth aspect, the initiating, by a terminal apparatus, a radio resource control connection establishment message based on that the terminal apparatus is in a suspend state and a radio capability of the terminal apparatus changes, or that the terminal apparatus is in a radio resource control inactive state and a radio capability of the terminal apparatus changes includes:

instructing, by a non-access stratum of the terminal apparatus, an access stratum of the terminal apparatus to initiate the radio resource control connection establishment message.

With reference to the fourth aspect, in some implementations of the fourth aspect, the radio resource control connection establishment message includes radio resource resume identification information.

In this embodiment of this application, the UE may directly initiate an RRC connection establishment procedure rather than initiating an RRC resume procedure, thereby avoiding a failure of the RRC resume procedure caused by the change in the radio capability. In addition, an indication indicating the change of the radio capability of the UE is carried in an RRC establishment message, so that the access network apparatus and a core network apparatus can learn of the change in the radio capability of the UE earlier, and a TAU procedure does not need to be performed to notify the change. The resume ID is carried in the RRC connection establishment procedure, to instruct the access network apparatus to delete the corresponding context of the UE.

With reference to the fourth aspect, in some implementations of the fourth aspect, the radio resource control connection establishment message further includes indication information, where the indication information is used to indicate that the radio capability of the terminal apparatus changes, or is used to request a current radio capability of the terminal apparatus from the access network apparatus.

Optionally, the indication information may be information used to indicate that the radio capability of the terminal apparatus changes, or may be information used to instruct the access network apparatus to delete or update the radio capability information of the terminal apparatus. The first radio capability indicates a radio access technology supported by the terminal apparatus.

According to a fifth aspect, a method for processing a change in a radio capability of a terminal apparatus is provided. The method includes:

sending, by a core network apparatus, indication information to an access network apparatus, where the indication information is used to indicate that a radio capability of a terminal apparatus changes, or is used to request a current radio capability of the terminal apparatus from the access network apparatus.

With reference to the fifth aspect, in some implementations of the fifth aspect, the sending, by a core network apparatus, indication information to an access network apparatus includes:

sending, by the core network apparatus, the indication information to the access network apparatus when the terminal apparatus is in a connected state.

With reference to the fifth aspect, in some implementations of the fifth aspect, the method further includes:

when the indication information is used to request the current radio capability of the terminal apparatus from the access network apparatus, sending an update indication to the access network apparatus, where the update indication is used to instruct the access network apparatus to update radio capability information of the terminal apparatus, and the update indication and the indication information may be carried in a same message.

With reference to the fifth aspect, in some implementations of the fifth aspect, when the indication information is used to indicate that the radio capability of the terminal apparatus changes, the indication information is further used to instruct the access network apparatus to update the radio capability of the terminal apparatus according to the indication information.

According to a sixth aspect, an access network apparatus for processing a change in a radio capability of a terminal apparatus is provided. The access network apparatus includes:

a transceiver module, configured to receive indication information, where the access network apparatus stores radio capability information of a terminal apparatus, and the indication information is used to indicate that a radio capability of the terminal apparatus changes, or is used to request a current radio capability of the terminal apparatus from the access network apparatus; and a processing module, configured to obtain radio capability information of the terminal apparatus according to the indication information.

In this embodiment of this application, when the radio capability of the UE in a suspend state changes, the access network apparatus processes, according to the indication information, context information of the radio capability of the terminal apparatus that is retained in the access network apparatus, so that the terminal apparatus can successfully resume a radio resource connection, thereby improving communication efficiency.

It should be understood that, that the access network apparatus processes the radio capability information in the access network apparatus may be that the access network apparatus updates the radio capability information, or may be that the access network apparatus deletes the radio capability information.

With reference to the sixth aspect, in some implementations of the sixth aspect, the transceiver module is specifically configured to:

receive a first message sent by the terminal apparatus, where the first message is used to request to resume a radio resource control connection, and the first message includes the indication information.

For example, the first message may be a radio resume request (RRC connection resume request) message in a radio resource resume (RRC Resume) procedure, or may be another message sent by the terminal apparatus to the access network apparatus in a radio resource resume procedure.

With reference to the sixth aspect, in some implementations of the sixth aspect, the transceiver module is specifically configured to:

receive a second message sent by the terminal apparatus, where the second message is used to indicate that radio resource control connection resume is completed, and the second message includes the indication information.

For example, the second message may be a radio resume complete (RRC connection resume complete) message in a radio resource resume (RRC Resume) procedure, or may be another message sent by the terminal apparatus to the access network apparatus in a radio resource resume procedure.

With reference to the sixth aspect, in some implementations of the sixth aspect, the transceiver module is specifically configured to:

receive a third message sent by the terminal apparatus, where the third message is used to indicate that a radio resource control connection is established, and the third message includes the indication information.

For example, the third message may be a radio resource connection establishment complete message in a radio resource connection establishment procedure, or another message in a radio resource connection establishment procedure.

With reference to the sixth aspect, in some implementations of the sixth aspect, the transceiver module receives the indication information sent by the core network apparatus, where the indication information is used to indicate that the radio capability of the terminal apparatus changes; and the processing module is further configured to update, according to the indication information, the radio capability information stored in the access network apparatus.

With reference to the sixth aspect, in some implementations of the sixth aspect, the processing module is specifically configured to:

when the indication information is used to request the current radio capability of the terminal apparatus from the access network apparatus, receive, by using the transceiver module, the indication information sent by the core network apparatus.

With reference to the sixth aspect, in some implementations of the sixth aspect, the transceiver module is specifically configured to:

receive a fourth message sent by the core network apparatus, where the fourth message is used to instruct the access network apparatus to delete or update the radio capability information of the terminal apparatus in the access network apparatus, the fourth message includes the indication information, and the core network apparatus is a mobility management entity or an access and mobility management function entity.

Optionally, the fourth message may be a new message used by the core network apparatus to indicate that the access network apparatus needs to delete or update a stored old context of the UE.

Optionally, the fourth message may be an existing message used by the core network apparatus to indicate that the access network apparatus needs to delete or update a stored old context of the UE.

For example, the core network apparatus instructs, by adding an information element to a connection establishment indication message, the access network apparatus to delete or update the old context of the UE.

Optionally, the fourth message may be a downlink non-access stratum (downlink NAS transport) message or a terminal apparatus transfer (UE information transfer) message sent by the core network apparatus to the access network apparatus, to indicate that the access network apparatus needs to delete a stored old context of the UE.

It should be understood that, in this embodiment of this application, the access network apparatus receives the indication information sent by the terminal apparatus. The indication information may be used to indicate that the radio capability of the terminal apparatus changes, or the indication information may be used to instruct the access network apparatus to update the radio capability information of the terminal apparatus, or the indication information may be used to instruct the access network apparatus to delete the radio capability information of the terminal apparatus. The radio capability may indicate a radio access technology supported by the terminal apparatus, for example, information such as an energy level and a frequency band.

With reference to the sixth aspect, in some implementations of the sixth aspect, the transceiver module is further configured to receive an update indication, where the update indication is used to instruct the access network apparatus to update the radio capability information of the terminal apparatus, and the indication information is sent by a core network apparatus.

For example, the update indication and the indication information may be carried in a same message.

With reference to the sixth aspect, in some implementations of the sixth aspect, the processing module is further configured to:

delete the radio capability information of the terminal apparatus that is stored before the processing module obtains the radio capability information from the terminal apparatus.

With reference to the sixth aspect, in some implementations of the sixth aspect, the radio capability includes at least one of system information or a transceiving capability supported by the terminal apparatus.

With reference to the sixth aspect, in some implementations of the sixth aspect, the terminal apparatus is in a radio resource suspend state or a radio resource inactive state.

It should be understood that, when the terminal apparatus is in the RRC suspend state or the RRC inactive state, a first radio capability changes. When resuming a radio resource connection, the terminal apparatus sends the indication information to the access network apparatus or the core network apparatus. The access network apparatus may process, according to the indication information, an old context of the UE retained in the access network apparatus. The old context may be a context of the UE before the radio capability changes.

According to a seventh aspect, an access network apparatus for processing a change in a radio capability of a terminal apparatus is provided. The access network apparatus includes:

a transceiver module, configured to receive radio resource resume identification information, where the apparatus stores radio capability information of a terminal apparatus; and a processing module, configured to process a context of the terminal apparatus in the access network apparatus based on the identification information.

In this embodiment of this application, when a radio capability of the UE in a suspend state changes, the terminal apparatus initiates a conventional radio resource connection establishment (RRC connection setup) procedure, and the access network apparatus processes, based on the identification information, context information of the terminal apparatus that is retained in the access network apparatus, so that the terminal apparatus can successfully resume a radio resource connection, thereby improving communication efficiency.

With reference to the seventh aspect, in some implementations of the seventh aspect, the processing module is specifically configured to:

delete the radio capability stored before the access network apparatus requests the radio capability from the terminal apparatus; or send an indication message by using the sending module, where the indication message is used to instruct a second access network apparatus to delete the context of the terminal apparatus, and the second access network apparatus is an access network apparatus accessed by the terminal apparatus when the terminal apparatus enters the suspend state.

It should be understood that the terminal apparatus may move to coverage of a new access network apparatus, namely, the second access network apparatus, when the terminal apparatus is in the suspend state, and initiate a conventional radio resource connection establishment procedure (RRC connection setup) without needing to retain the context information in the access network device. Therefore, the access network apparatus needs to delete the retained context information of the UE, to release a resource.

With reference to the seventh aspect, in some implementations of the seventh aspect, the transceiver module is further configured to:

receive a third message sent by the terminal apparatus, where the third message is used to indicate that radio resource control connection establishment is completed, and the third message includes the indication information.

For example, the third message may be a radio resource connection establishment complete message in a radio resource connection establishment procedure, or another message in a radio resource connection establishment procedure.

In this embodiment of this application, the UE may directly initiate an RRC connection establishment procedure rather than initiating an RRC resume procedure, thereby avoiding a failure of the RRC resume procedure caused by the change in the radio capability. In addition, an indication indicating the change of the radio capability of the UE is carried in an RRC establishment message, so that the access network apparatus and a core network apparatus can learn of the change in the radio capability of the UE earlier, and a TAU procedure does not need to be performed to notify the change. The resume ID is carried in the RRC connection establishment procedure, to instruct the access network apparatus to delete the corresponding context of the UE.

With reference to the seventh aspect, in some implementations of the seventh aspect, the processing module is further configured to:

send a radio capability request of the UE to the terminal apparatus according to the indication information; and the access network apparatus receives the radio capability of the UE that is reported by the terminal apparatus.

For example, the access network apparatus requests the radio capability of the UE from the terminal apparatus according to the indication information. The indication information may be considered as a trigger condition for requesting the radio capability of the UE. After receiving the radio capability request, the terminal apparatus reports the current radio capability of the UE, for example, a second radio capability, to the access network apparatus.

According to an eighth aspect, a terminal apparatus for processing a change in a radio capability of a terminal apparatus is provided. The terminal apparatus includes:

a transceiver module, configured to send indication information to an access network apparatus, where the indication information is used to indicate that a radio capability of the terminal apparatus changes, or is used to instruct the access network apparatus to update radio capability information of the terminal apparatus.

In this embodiment of this application, when the radio capability of the UE in a suspend state changes, the access network apparatus processes, according to the indication information, context information of a first radio capability of the terminal apparatus that is retained in the access network apparatus, so that the terminal apparatus can successfully resume a radio resource connection, thereby improving communication efficiency.

It should be noted that the apparatus may further include a processing module, and the processing module is configured to generate the indication information or determine the indication information.

With reference to the eighth aspect, in some implementations of the eighth aspect, the transceiver module is specifically configured to:

send a first message to the access network apparatus, where the first message is used to request to resume a radio resource control connection, and the first message includes the indication information.

For example, the first message may be a radio resume request (RRC connection resume request) message in a radio resource resume (RRC Resume) procedure, or may be another message sent by the terminal apparatus to the access network apparatus in a radio resource resume procedure.

With reference to the eighth aspect, in some implementations of the eighth aspect, the transceiver module is specifically configured to:

send a second message, where the second message is used to indicate that radio resource control connection resume is completed, and the second message includes the indication information.

For example, the second message may be a radio resume complete (RRC connection resume complete) message in a radio resource resume (RRC Resume) procedure, or may be another message sent by the terminal apparatus to the access network apparatus in a radio resource resume procedure.

With reference to the eighth aspect, in some implementations of the eighth aspect, the transceiver module is specifically configured to: send a third message to the access network apparatus, where the third message is used to indicate that a radio resource control connection is established, and the third message includes the indication information.

With reference to the eighth aspect, in some implementations of the eighth aspect, the apparatus further includes a processing module, where the processing module is configured to:

resume security of a signaling radio bearer and an access stratum, and skip resuming a data radio bearer.

For example, a first radio capability changes when the terminal apparatus is in the suspend state. The terminal apparatus sends the indication information to the access network apparatus. When the terminal apparatus receives a radio resource connection resume (RRC connection resume) response of the access network apparatus, the terminal apparatus may simultaneously resume security of all of the SRB, the DRB, and the AS, and the UE enters an RRC connected state. Alternatively, the terminal apparatus may resume security of the SRB and the AS, and the UE does not establish the DRB temporarily.

With reference to the eighth aspect, in some implementations of the eighth aspect, the transceiver module is further configured to receive a data radio bearer configuration sent by the access network apparatus; and the processing module is configured to resume security of the data radio bearer based on the data radio bearer configuration.

It should be noted that, when the terminal apparatus resumes security of an SRB and an AS, and the UE does not establish a DRB temporarily, the access network apparatus configures a DRB configuration of the UE based on the current radio capability of the UE and a status of a base station. In this case, the UE resumes a DRB, and the UE enters an RRC connected state.

For example, the terminal apparatus may resume security of an SRB and an AS, and the UE does not establish a DRB temporarily, the access network apparatus sends a radio capability request of the UE to the terminal apparatus. The terminal apparatus reports the radio capability of the UE, such as a second radio capability, to the access network apparatus. The access network apparatus configures a DRB of the UE based on the second radio capability and a status of the access network, and the UE resumes the DRB based on the DRB configured by the access network apparatus.

According to a ninth aspect, a terminal apparatus for processing a change in a radio capability of a terminal apparatus is provided. The terminal apparatus includes:

a processing module, configured to initiate, by using a transceiver module, a radio resource control connection establishment message based on that the terminal apparatus is in a suspend state and a radio capability of the terminal apparatus changes, or that the terminal apparatus is in a radio resource control inactive state and a radio capability of the terminal apparatus changes.

In this embodiment of this application, when a radio capability of the UE in a suspend state changes, the terminal apparatus initiates a conventional radio resource connection establishment (RRC connection setup) procedure, and an access network apparatus processes, based on identification information, context information of the terminal apparatus that is retained in the access network apparatus, so that the terminal apparatus can successfully resume a radio resource connection, thereby improving communication efficiency.

With reference to the ninth aspect, in some implementations of the ninth aspect, the radio resource control connection establishment message further includes indication information, where the indication information is used to indicate that the radio capability of the terminal apparatus changes, or is used to request a current radio capability of the terminal apparatus from the access network apparatus.

With reference to the ninth aspect, in some implementations of the ninth aspect, the radio resource control connection establishment message includes radio resource resume identification information.

In this embodiment of this application, the UE may directly initiate an RRC connection establishment procedure rather than initiating an RRC resume procedure, thereby avoiding a failure of the RRC resume procedure caused by the change in the radio capability. In addition, an indication indicating the change of the radio capability of the UE is carried in an RRC establishment message, so that the access network apparatus and a core network apparatus can learn of the change in the radio capability of the UE earlier, and a TAU procedure does not need to be performed to notify the change. The resume ID is carried in the RRC connection establishment procedure, to instruct the access network apparatus to delete the corresponding context of the UE.

With reference to the ninth aspect, in some implementations of the ninth aspect, the radio resource control connection establishment message further includes indication information, where the indication information is used to indicate that the radio capability of the terminal apparatus changes, or is used to request a current radio capability of the terminal apparatus from the access network apparatus.

For example, the indication information may be information used to indicate that a first radio capability of the terminal apparatus changes, or may be information used to instruct the access network apparatus to delete or update a first radio capability of the terminal apparatus. The first radio capability indicates a radio access technology supported by the terminal apparatus.

According to a tenth aspect, a core network apparatus for processing a change in a radio capability of a terminal apparatus is provided. The core network apparatus includes:

a transceiver module, configured to send indication information to an access network apparatus, where the indication information is used to indicate that a radio capability of a terminal apparatus changes, or is used to request a current radio capability of the terminal apparatus from the access network apparatus.

With reference to the tenth aspect, in some implementations of the tenth aspect, the apparatus further includes a processing module, where the processing module is configured to send, by using the transceiver module, the indication information to the access network apparatus when the terminal apparatus is in a connected state.

With reference to the tenth aspect, in some implementations of the tenth aspect, when the indication information is used to request the current radio capability of the terminal apparatus from the access network apparatus, the transceiver module sends an update indication to the access network apparatus, where the update indication is used to instruct the access network apparatus to update radio capability information of the terminal apparatus.

With reference to the tenth aspect, in some implementations of the tenth aspect, when the indication information is used to indicate that the radio capability of the terminal apparatus changes, the indication information is further used to instruct the access network apparatus to update the radio capability of the terminal apparatus according to the indication information.

According to an eleventh aspect, an apparatus for processing a change in a radio capability of a terminal apparatus is provided. The apparatus includes a transceiver, a processor, and a memory. The processor is configured to control the transceiver to send and receive a signal. The memory is configured to store a computer program. The processor is configured to invoke the computer program from the memory and run the computer program, so that the network device performs the method according to any one of the first aspect to the fifth aspect or the possible implementations of the first aspect to the possible implementations of the fifth aspect.

According to a twelfth aspect, a computer-readable medium is provided. The computer-readable medium stores a computer program. When the computer program is executed by a computer, the method according to any one of the first aspect to the fifth aspect or the possible implementations of the first aspect to the possible implementations of the second aspect is implemented.

According to a thirteenth aspect, a computer program product is provided. When the computer program product is executed by a computer, the method according to any one of the first aspect to the fifth aspect or the possible implementations of the first aspect to the possible implementations of the fifth aspect is implemented.

DESCRIPTION OF EMBODIMENTS

Figure 1:
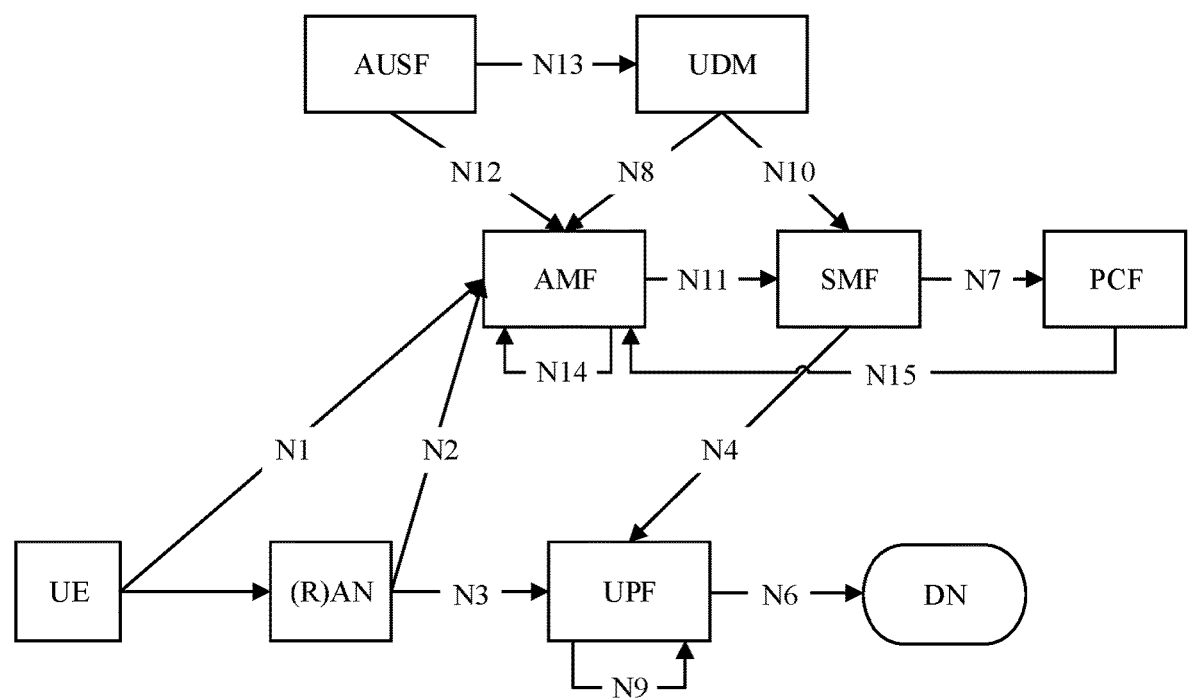
FIG. 1 is a schematic diagram of a possible network architecture applied to an embodiment of this application.

The following describes the technical solutions of this application with reference to the accompanying drawings.

The technical solutions of the embodiments of this application may be applied to various communications systems, such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunication system (UMTS), a worldwide interoperability for microwave access (WiMAX) communications system, a future 5th generation (5G) system, a new radio (NR), or a possible future communications system.

A terminal apparatus in the embodiments of this application may be user equipment, an access terminal, a subscriber unit, a subscriber station, a mobile station, a mobile station, a remote station, a remote terminal, a mobile device, a user terminal, a terminal, a wireless communications device, a user agent, or a user apparatus. Alternatively, the terminal apparatus may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal apparatus in a future 5G network, or a terminal apparatus in a future evolved public land mobile network (PLMN). This is not limited in the embodiments of this application.

A core network (CN) device in the embodiments of this application may be a control plane anchor of the terminal apparatus, and provides functions such as registration area update for the terminal. For example, the core network apparatus may include an access and mobility management function (AMF) entity. The core network apparatus may be a network device configured to provide functions such as core network access (core access) and mobility management for the terminal. A specific function of the core network apparatus may be similar to a function of a mobility management entity (MME) in an LTE system.

An access network apparatus in the embodiments of this application may be a device configured to communicate with the terminal apparatus, and the access network apparatus may be a radio access network (RAN) device. The RAN device may include various types of base stations. For example, the base station in the embodiments of this application may include macro base stations, micro base stations, relay stations, access points, and the like in various forms. In systems that use different radio access technologies, devices with a base station function may have different names. For example, in an LTE network, a device with a base station function is referred to as an evolved NodeB (eNB or eNodeB). In a 3rd generation (3G) network, a device with a base station function is referred to as a NodeB. In a 5th generation (5G) network, a device with a base station function is referred to as a g-NodeB (gNB) or the like. This is not limited in the embodiments of this application.

In a possible manner, the access network device may include a centralized unit (CU) and a distributed unit (DU). One CU may be connected to one DU, or a plurality of DUs may share one CU, to reduce costs and facilitate network expansion. The CU and the DU may be divided based on a protocol stack. In a possible manner, a radio resource control (RRC) layer, a service data mapping protocol stack (SDAP) layer, and a packet data convergence protocol (PDCP) layer are deployed on the CU, and a remaining radio link control (RLC) layer, media access control (MAC) layer, and physical layer are deployed on the DU.

In addition, in the embodiments of this application, the access network device provides a service for a cell, and the terminal apparatus communicates with a network device by using a transmission resource (for example, a frequency domain resource or a spectrum resource) used by the cell. The cell may be a cell corresponding to the network device (for example, a base station). The cell may belong to a macro base station, or may belong to a base station corresponding to a small cell. The small cell herein may include a metro cell, a micro cell, a pico cell, a femto cell, and the like. These small cells are characterized by small coverage and low transmit power, and are applicable to providing a high-rate data transmission service.

A context refers to establishment of a context session in a communications system, mainly refers to establishment of a connection between function entities, and is used for information transmission, or refers to information stored in an entity.

For example, a context in LTE is mainly an EPS bearer context, and is established in a process of establishing a connection link between UE and a P-GW. Signaling interaction may be performed after a signaling bearer is established, and a data packet may be sent/received after a data bearer is established.

A radio capability includes a radio access technology (RAT) supported by UE, for example, an energy level or a frequency band.

The technical solutions in the embodiments of this application may be specifically applied to a 5G system in a non-roaming scenario. The following describes the 5G system in the non-roaming scenario with reference to FIG. 1.

FIG. 1 is a schematic diagram of an architecture of the 5G system in the non-roaming scenario.

The system architecture shown in FIG. 1 includes user equipment (UE), a radio access network (RAN), an access and mobility management network element (AMF), a session management network element (SMF), a user plane network element (UPF), a policy control network element (PCF), a unified data management network element (UDM), an authentication server function (AUSF) entity, and a data network (DN) module.

Main functions of devices in a core network in the system architecture shown in FIG. 1 are as follows:

An access and mobility management function (AMF) is mainly used for mobility management, access management, and the like, and may be used to implement functions other than session management in functions of a mobility management entity (MME), for example, functions such as lawful interception and access authorization/authentication.

A session management function (SMF) is mainly used for session management, internet protocol (IP) address allocation and management of a terminal apparatus, manageable user plane function selection, a termination point of a policy control and charging function interface, a downlink data notification, and the like.

A user plane function (UPF) has a main function of routing and forwarding a data packet, and may be used as a mobility anchor or an uplink classifier to support routing of a service flow to a DN, or may be used as a BP to support a multi-homing PDU session, and the like.

The policy control network element (PCF) is a policy decision point, and has main functions of providing rules for service flow detection, application detection, gate control, QoS, and flow-based charging control.

A (radio) access network (short for (R)AN) is used to provide a network access function for an authorized user in a specific area, and can use transmission tunnels with different quality based on user levels, service requirements, and the like. The (R)AN network element can manage radio resources and provide an access service for a terminal apparatus, to forward a control signal and user data between the terminal apparatus and the core network. The (R)AN network element may alternatively be understood as a base station in a conventional network.

An authentication server function (AUSF) is mainly used for user authentication and the like.

An application function (AF) is used for interaction with a 3GPP core network to provide a service. The interaction includes interaction with a NEF, interaction with a policy architecture, and the like. Main functions of the network exposure function (NEF) include: securely opening, to inside, a third party, or the like, a service and a capability that are provided by a 3GPP network function; and converting or translating information exchanged with the AF and information exchanged with an internal network function, for example, an AF service identifier and internal 5G core network information such as a DNN and an S-NSSAI.

The network exposure function (NEF) is used to securely open, to outside, a service and a capability that are provided by a 3GPP network function.

A unified data management (UDM) is used for processing user identifier, access authentication, registration, mobility management, and the like.

It should be noted that names of the network elements (such as the SMF, the AF, and the UPF) included in FIG. 1 are also merely names, and the names do not constitute any limitation on the functions of the network elements. In a 5G network and another future network, the foregoing network elements may alternatively have other names. This is not specifically limited in the embodiments of this application. For example, in a 6G network, some or all of the foregoing network elements may still use terms in 5G, or may use other names, or the like. This is uniformly described herein. Details are not described in the following.

It should be understood that the foregoing network architecture applied to the embodiments of this application is merely an example of a network architecture for description, and a network architecture applicable to the embodiments of this application is not limited thereto. Any network architecture that can implement the functions of the foregoing network elements is applicable to the embodiments of this application.

Figure 2:
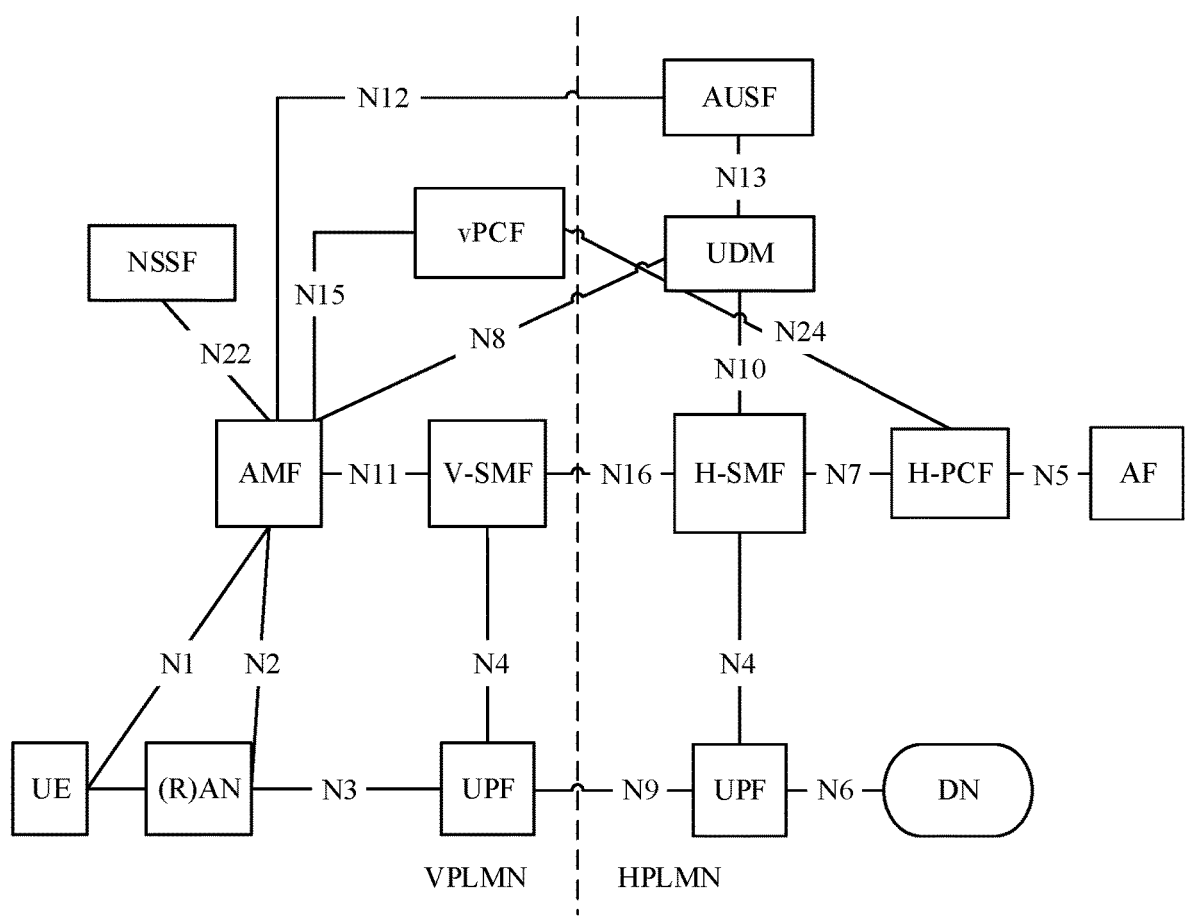
FIG. 2 is a schematic diagram of a possible network architecture applied to an embodiment of this application.

It should be understood that, in addition to the 5G system in the non-roaming scenario shown in FIG. 1, the technical solutions in the embodiments of this application may be applied to another system architecture. For example, the technical solutions in the embodiments of this application may also be applied to a 5G system in a roaming scenario shown in FIG. 2.

The technical solutions in the embodiments of this application may be specifically applied to a 4G system in a non-roaming scenario. The following describes the 4G system in the non-roaming scenario with reference to FIG. 3.

Figure 3:
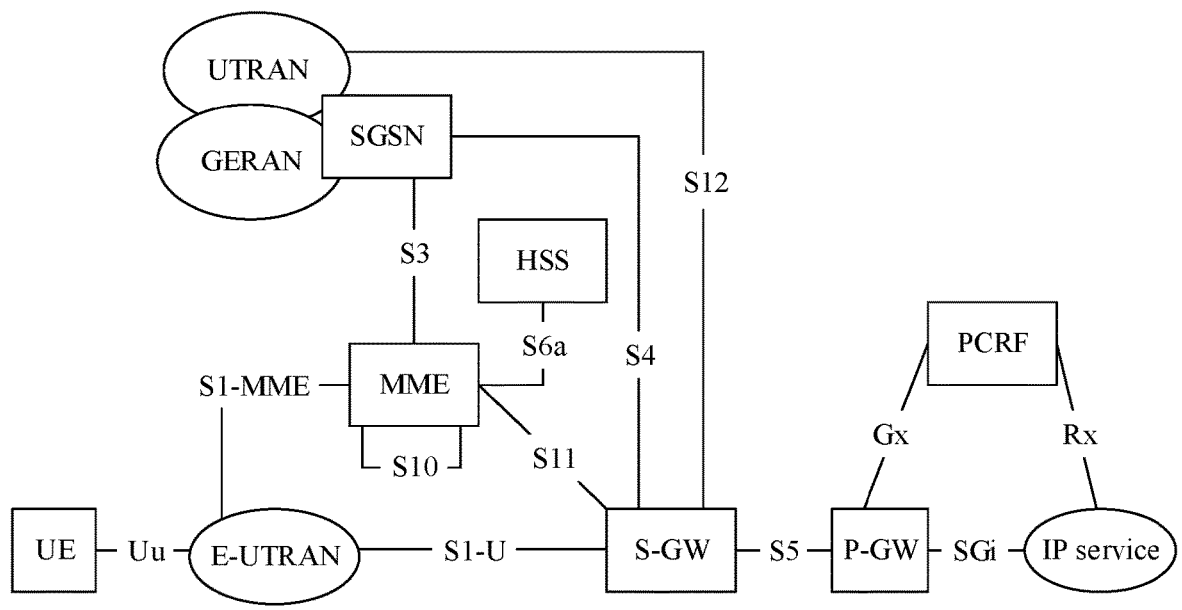
FIG. 3 is a schematic diagram of a possible network architecture applied to an embodiment of this application.

FIG. 3 is a schematic diagram of an architecture of the 4G system in the non-roaming scenario.

The system architecture shown in FIG. 3 includes user equipment (UE), a mobility management entity (MME), a packet data network gateway (P-GW), a serving gateway (S-GW), and the like.

Main functions of devices in a core network in the system architecture shown in FIG. 3 are as follows:

An evolved universal terrestrial radio access network (EUTRAN) is a network including a plurality of eNodeBs, and implements a radio physical layer function, resource scheduling and radio resource management, radio access control, and a mobility management function. The eNodeB is connected to the S-GW through a user plane interface S1-U, and is configured to transmit user data; and is connected to the MME through a control plane interface S1-MME, and implements a function such as radio access bearer control by using an S1-AP protocol.

The MME is mainly responsible for all control plane functions of user plane session management, including non-access stratum (NAS) signaling and security, tracking area management, P-GW and S-GW selection, and the like.

The S-GW is mainly responsible for data transmission, data forwarding, route switching, and the like of the user equipment, and serves as a local mobility anchor point when the user equipment is handed over between the eNodeBs (for each piece of user equipment, only one S-GW serves the user equipment at each moment).

The P-GW serves as an anchor point of a PDN connection, and is responsible for IP address allocation of the user equipment, and data packet filtering, rate control, charging information generation, and the like for the user equipment.

Figure 4:
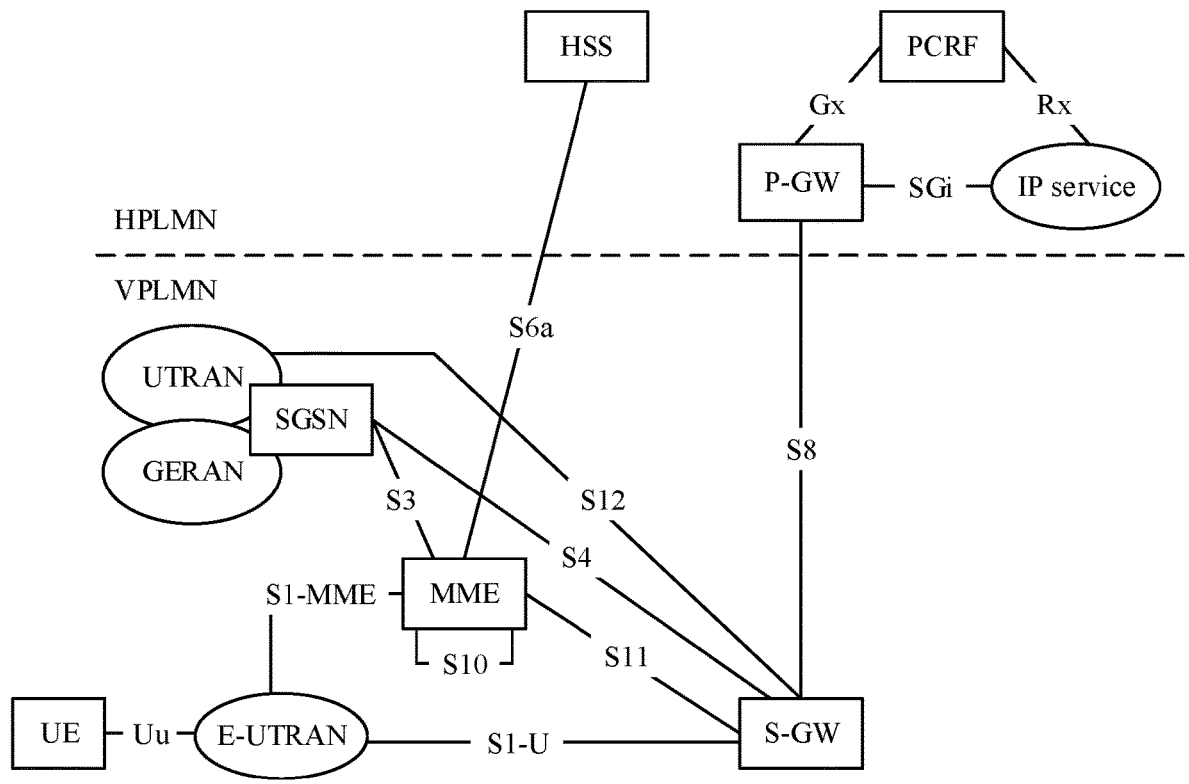
FIG. 4 is a schematic diagram of a possible network architecture applied to an embodiment of this application.

It should be understood that, in addition to the 4G system in the non-roaming scenario shown in FIG. 3, the technical solutions in the embodiments of this application may be applied to another system architecture. For example, the technical solutions in the embodiments of this application may also be applied to a 4G system in a roaming scenario shown in FIG. 4.

A user plane enhancement technology of an internet of things of 4G is used as an example for description below.

In 4G, to better support a cellular internet of things (CIoT) device, a user plane transmission enhancement technology is introduced. When UE and a network support a user plane optimization data transmission scheme, the network suspends an established connection by using a connection suspend procedure. In the connection suspend procedure, a context of the UE and a context of a bearer are stored, and the UE enters an idle state. In this case, when the UE needs to send data, the UE may quickly resume a connection by using a connection resume procedure, to enter a connected state, without initiating a service request procedure.

Figure 5:
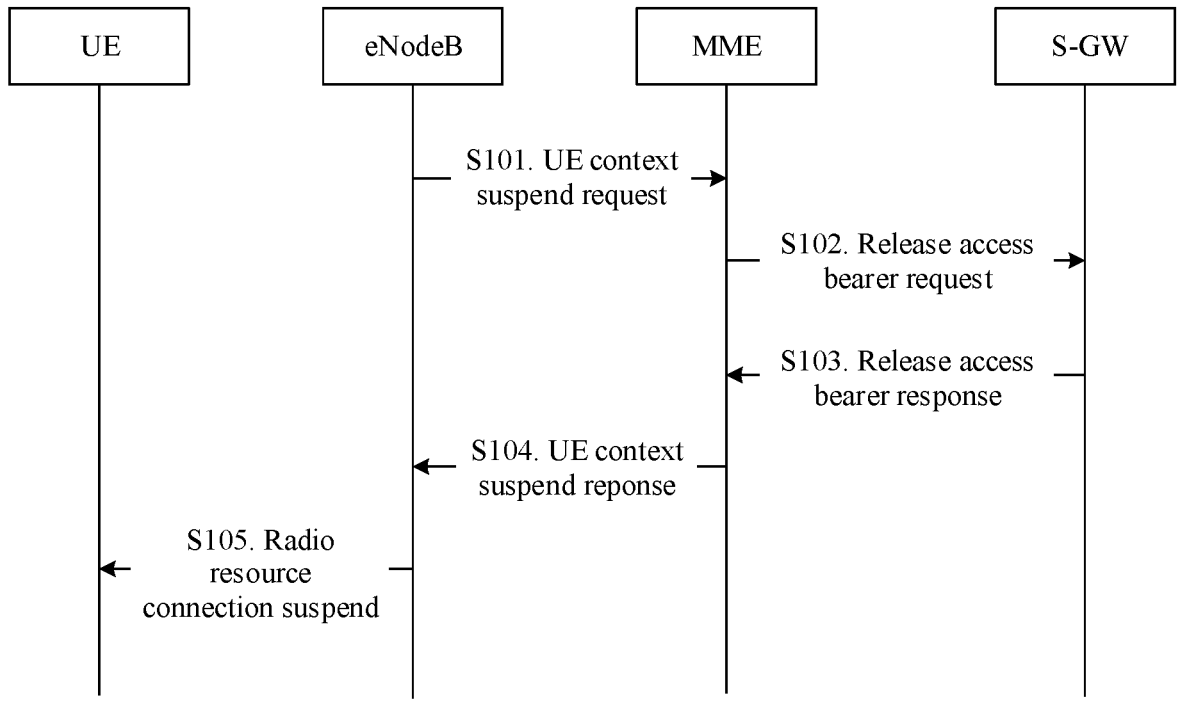
FIG. 5 is a schematic diagram of a radio resource connection suspend procedure initiated by UE.

FIG. 5 is a schematic diagram of a connection suspend procedure initiated by an eNB in a 4G system.

S101: The eNodeB sends an S1-AP UE context suspend request message to an MME, to trigger a connection suspend procedure. The eNodeB indicates to the MME that an RRC connection of UE is to be suspended, and therefore the MME enters an ECM-idle state. The eNB, the UE, and the MME retain data related to an S1-AP association, a context of UE, and a context of a bearer that are required for resuming a connection.

The eNodeB may add an information element "information on recommended cells and eNBs for Paging" to the S1-AP UE context suspend request message. After receiving the information, the MME should store the information for use when paging the UE.

If an information element "information for enhanced coverage" is available, the eNB adds the information element "information for enhanced coverage" to the S1-AP UE context suspend request message.

S102. The MME sends a release access bearer request message to an SGW, to request to release all S1-U bearers of the UE.

S103: The SGW releases all information (an address and a downlink TEID) related to the eNodeB of the UE, and returns a release access bearer response message to the MME, to instruct to release all the S1-U bearers. Another element in a context of the UE in the SGW is not affected. If the SGW further receives a downlink data packet of the UE, the SGW buffers the received downlink data packet of the UE and initiates a "network trigger service request" procedure.

It should be noted that, according to a policy of an operator, any received prompt "the abnormal release of radio link" may be used by the SGW to subsequently determine to trigger suspending PDN charging, provided that the PDN enables this function.

S104. The MME sends an S1-AP UE context suspend response message to the eNB, to successfully terminate the connection suspend procedure initiated by the eNB.

S105: The eNodeB sends an RRC message to the UE, to suspend an RRC connection from the eNodeB to the UE.

Figure 6:
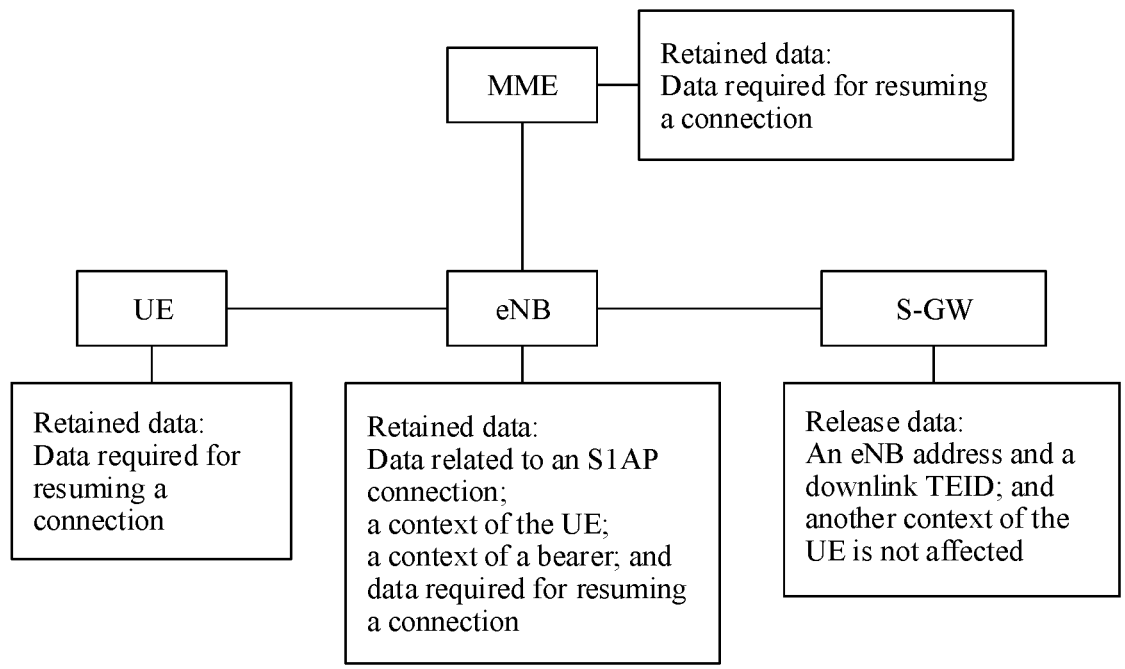
FIG. 6 is a schematic diagram of a context retained in each network element in a radio resource connection suspend procedure initiated by UE.

A context stored in each network element in the connection suspend procedure is shown in FIG. 6.

A data packet retained in the MME includes data required for resuming a connection.

For example, an S1AP association relationship (S1AP association) includes a UE context bearer and a context of the UE that are of a downlink TEID.

The data packet retained in the UE includes the data required for resuming a connection.

The data retained in the eNB may include data related to an S1AP connection, the context of the UE, the context of the bearer, and the related data required for resuming a connection.

Data released from the S-GW may include an eNB address, the downlink TEID, and another released context of the UE.

For a connection resume procedure, if the UE and a network support user plane optimization data transmission, and the UE has stored necessary information for performing the connection resume procedure, the UE uses this procedure to resume an ECM connection. Otherwise, the UE shall use a service request procedure to resume a connection.

Figure 7:
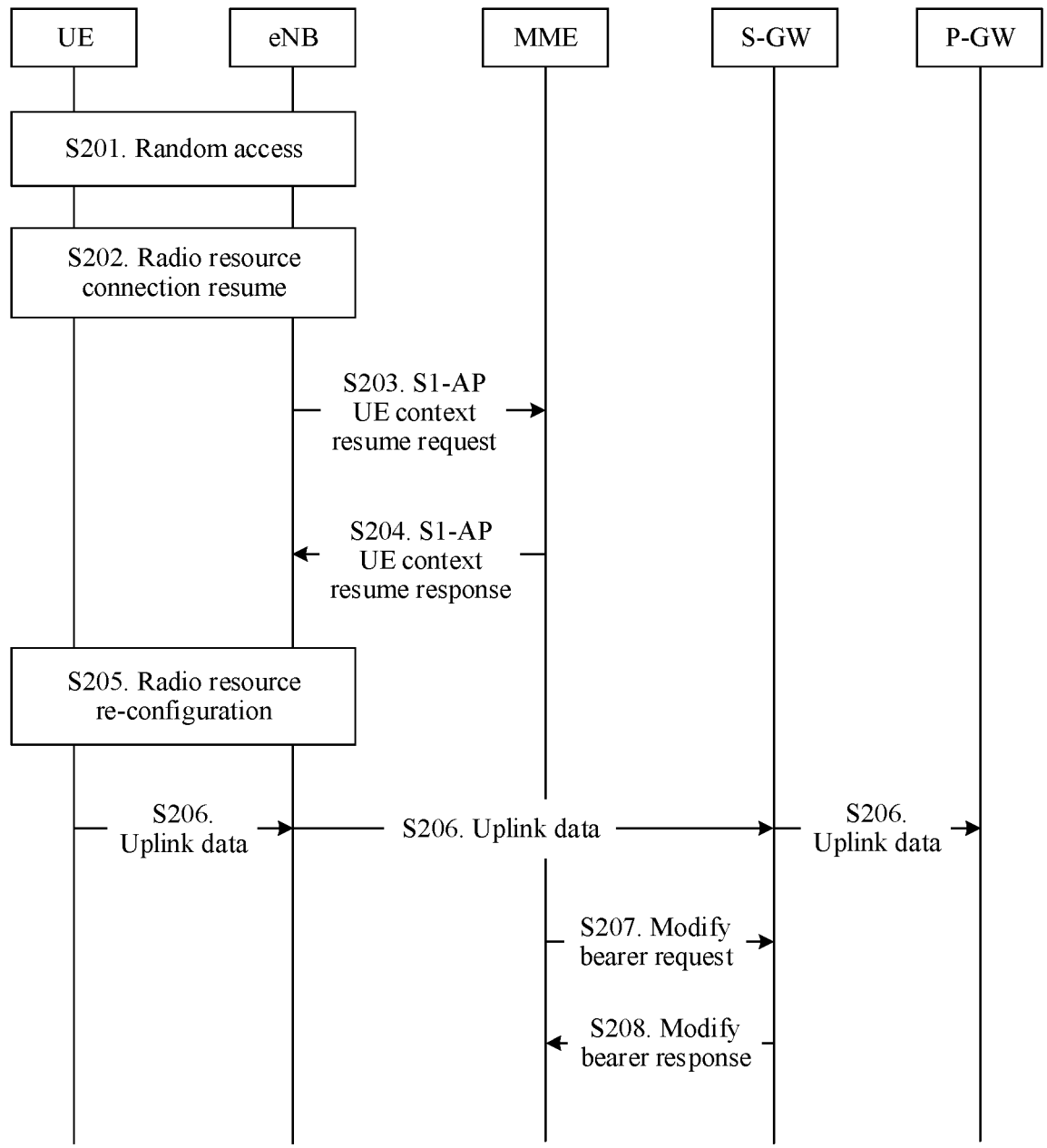
FIG. 7 is a schematic diagram of a radio resource connection resume procedure initiated by UE.

When the connection is resumed, all bear connections are also resumed. FIG. 7 shows a connection resume procedure. Contexts of UE and all bears are stored in the UE, an eNodeB, an MME, and an S-GW, so that all bears except a bearer that fails to be resumed can be quickly resumed.

FIG. 7 is a schematic diagram of a connection resume procedure initiated by an eNB in a 4G system.

S201. UE triggers a random access procedure from the UE to the eNodeB.

S202. The UE triggers a radio resource connection resume (RRC connection Resume) procedure, including information required by the eNodeB to access a stored AS context of the UE. The E-UTRAN performs a security check. An EPS bearer status is synchronized between the UE and a network. To be specific, the UE locally removes an EPS bearer that is not established for the UE or an EPS bearer that is not a control plane bearer. If a radio bearer for a default EPS bearer is not established, the UE locally deactivates all EPS bearers associated with the default EPS bearer.

S203: The eNodeB sends an S1-AP UE context resume request message to an MME, to notify RRC connection resume of the UE. If the eNodeB cannot allow all suspended bearers, the eNodeB shall perform identification in an information element "E-RAB Failed To Resume List". The MME enters an ECM-connected state. The MME identifies locally stored connection suspend procedure data that is corresponding to the UE and that is returned to the eNodeB. The data includes data related to an S1AP association, a context of the UE, and a context of a bearer that includes a DL TEID. (For example, the connection suspend procedure shown in FIG. 5).

If the eNodeB does not accept a default EPS bearer, all EPS bearers associated with the default bearer should be considered as unaccepted bearers. The MME may trigger a bearer release procedure to release bearers that are not accepted and not established.

In an example, if an S1-U connection is resumed and the UE accesses an NB-IoT RAT with an RRC resume cause "MO exception data," the MME shall maintain an MO exception data counter and send the MO exception data counter to an SGW, to notify the SGW of use of this establishment cause.

In an example, if an RRC establishment cause "MO exception data" has been used by an MO exception data counter, an SGW should notify a PGW. The SGW indicates, by using a related counter on a CDR of the SGW, use of the RRC establishment cause each time.

In an example, a PGW indicates, by using a related counter on a CDR of the PGW, each use of an RRC establishment cause "MO exception data".

S204. The MME returns an S1-AP UE context resume response message to the eNB, to acknowledge connection resume. If the MME cannot allow all suspended E-RABs, the MME shall perform indication in an information element "E-RAB Failed To Resume List."

S205: If the MME indicates, in step S204, that there is a list of an E-RAB that fails to be resumed, the eNodeB reconfigures a radio bearer.

S206: The eNodeB may forward, to an SGW, uplink data from the UE. The eNodeB may send the uplink data to an SGW address and a TEID (for example, the connection suspend procedure shown in FIG. 5) that are stored in the connection suspend procedure, and the SGW forwards the uplink data to a PGW.

S207: The MME sends, for each PDN connection, a modify bearer request message (including an eNodeB address, an S1 TEID (downlink) of an accepted EPS bearer, a delay downlink packet notification request, and a RAT type) to the SGW.

If the SGW supports a modify access bearers request procedure, and the SGW does not need to send signaling to the PGW, the MME may send, for the UE, a modify access bearer request message (including an eNodeB address and a TEID that are of a downlink user plane of the accepted EPS bearer, and the delay downlink packet notification request) to the SGW, to optimize signaling. The SGW now can send downlink data to the UE.

The MME and the SGW clear downlink data buffer timers (if the times are previously set) in a context of UE of the MME and a context of UE of the SGW. Any downlink data buffered by the UE for using a power saving function should be transmitted, to avoid establishing an unnecessary user plane connection in a subsequent tracking area update (TAU) procedure.

S208. The SGW should return a modify bearer response message (an SGW address and an uplink TEID) to the MME, to respond to the modify bearer request message, or return a modify access bearer response message (an SGW address and an uplink TEID), to respond to the modify access bearer request message. If the SGW cannot serve the request of the MME in the modify access bearer request message without S5/S8 signaling (except for cancelling suspending charging in the PGW), the SGW shall feed back, to the MME, an indication that modification is not limited to an S1-U bearer, the MME shall use the modify bearer request message for each PDN connection to repeat a request of the MME.

The 4G system is used as an example to describe a user plane enhancement procedure (Suspend/Resume) above. It should be understood that this embodiment of this application is also applicable to a user plane enhancement procedure and a radio resource inactive (RRC Inactive) procedure in 5G. For the RRC inactive procedure, a main difference from the user plane enhancement procedure is that UE is in a connected state. For the user plane enhancement procedure in 5G, a main difference from a user plane enhancement procedure in 4G is that the procedure is applied to an architecture in 5G. This is not limited in the embodiments of this application.

According to a current protocol, a radio capability of UE cannot change when the UE is in a connected state, and can change only when the UE is in an idle state. If the capability of the UE in the idle state changes, in a TAU procedure, the UE may notify an MME of the change in the radio capability of the UE by using non-access stratum (NAS) signaling. The MME notifies a RAN. The RAN obtains the radio capability of the UE from the UE, and sends the capability to the MME. When the UE is in an RRC suspend state, the UE first performs RRC resume, resumes a signaling radio bearer (SRB) and a data radio bearer (DRB), and then performs the TAU procedure.

When the UE is in an RRC suspend state, the UE is in an idle state, and the UE may change the radio capability. In a suspend/resume mechanism, the RAN stores a context of the radio capability of the UE. If the radio capability of the UE changes, the RAN still processes the RRC resume of the UE based on the radio capability of the UE stored in the RAN before the radio capability of UE changes. Therefore, an error may occur in the RRC resume.

Figure 8:
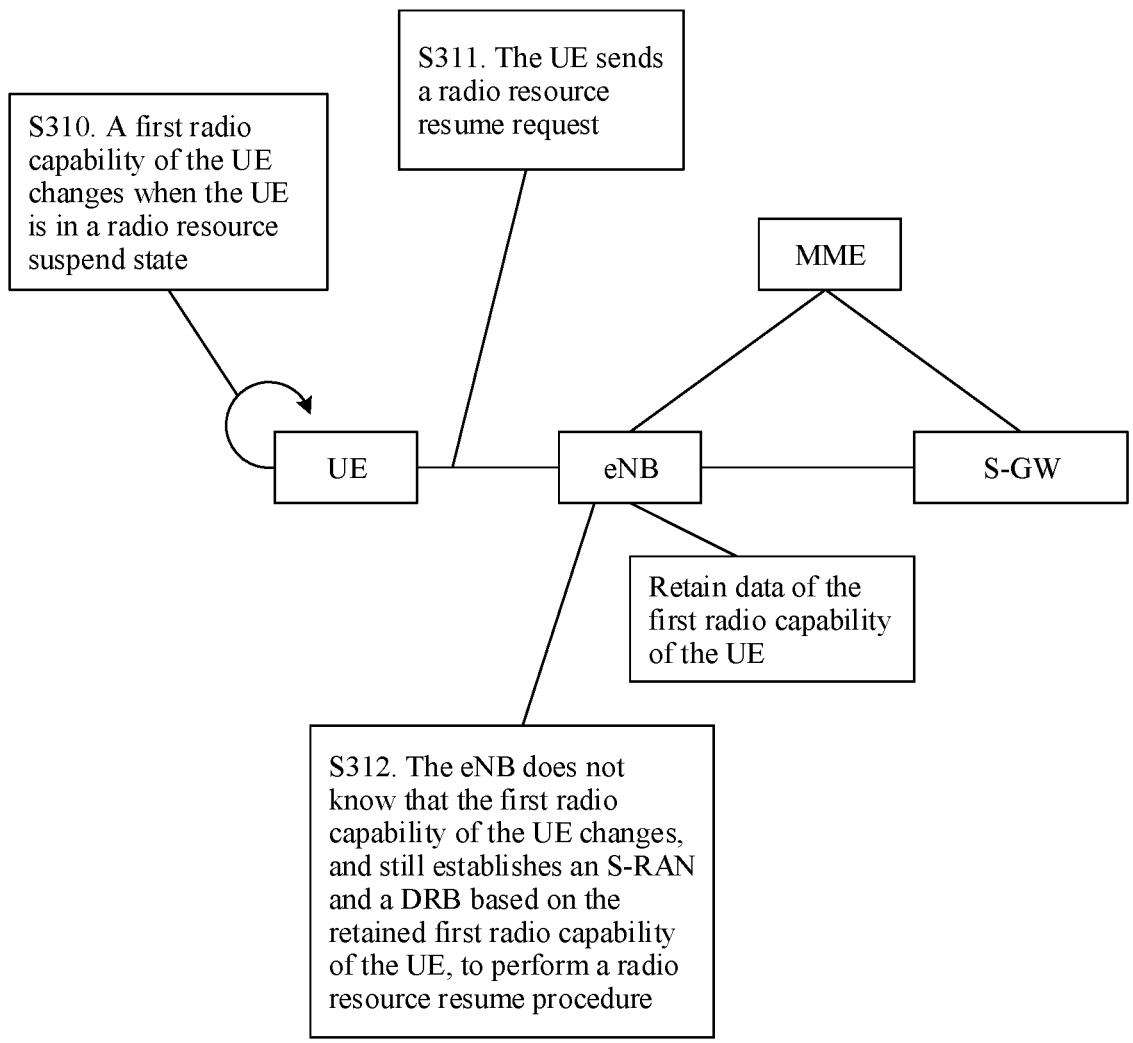
FIG. 8 is a schematic diagram of a context retained in each network element in a radio resource connection resume procedure initiated by UE.

For example, FIG. 8 is a schematic diagram of resuming a radio resource when a radio capability of UE changes.

S310. A radio capability of the UE changes when the UE is in an RRC suspend state.

S311. The UE sends a radio resource resume request to an eNB.

S312. The eNB establishes an SRB and a DRB based on retained resume data of a first radio capability of the UE, to perform an RRC resume procedure.

It should be understood that, when the first radio capability of the UE changes, the eNB does not know that the first radio capability of the UE changes. Therefore, the eNB still performs a radio resource resume procedure based on the previously retained context of the UE. Consequently, an error may occur in the radio resource resume procedure.

It should be noted that, when the first radio capability of the UE changes, if RRC resume succeeds, a RAN needs to be instructed to update and delete the context of the UE that is stored in the RAN before the radio capability of the UE changes. However, currently in a suspend/resume mechanism, there is no manner in which an MME instructs the RAN to delete the context of the UE. If an error occurs in the RRC resume, a conventional radio resource connection establishment (RRC connection establishment) procedure needs to be performed. Establishment of an RRC connection through trial and error causes an increase of a time of the RRC connection. In addition, if the RRC resume is processed based on the error, operation and maintenance load of a network may also be increased.

In view of this, this application provides a method for processing a change in a radio capability of a terminal apparatus. In the embodiments of this application, when a radio capability of UE changes, an eNB can learn of the change in the radio capability of the UE by using indication information, to delete and update a context retained before the radio capability of the UE changes, thereby resolving a problem that when the UE is in a radio resource suspend state, a change in the radio capability of the UE causes an error to occur in the RRC resume or network load to increase.

The following describes in detail the embodiments of this application with reference to specific examples. It should be noted that the descriptions are merely intended to help a person skilled in the art better understand the embodiments of this application, but are not intended to limit the scope of the embodiments of this application.

Figure 9:
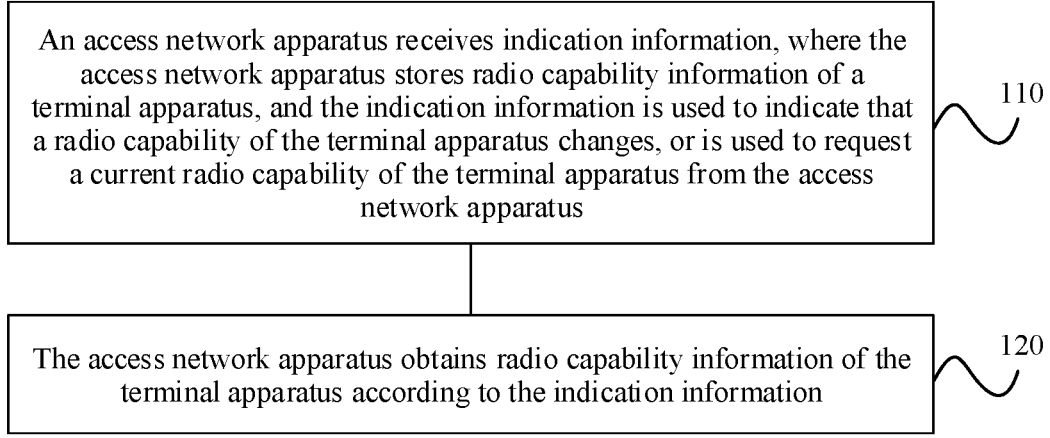
FIG. 9 is a schematic diagram of a method for processing a change in a radio capability of a terminal apparatus according to an embodiment of this application.

FIG. 9 is a schematic diagram of a method for processing a change in a radio capability of a terminal apparatus according to an embodiment of this application. The method shown in FIG. 9 may be applied to the systems in FIG. 1 to FIG. 4.

S110. An access network apparatus receives indication information, where the access network apparatus stores radio capability information of a terminal apparatus, and the indication information is used to indicate that a radio capability of the terminal apparatus changes, or is used to request a current radio capability of the terminal apparatus from the access network apparatus.

S120. The access network apparatus obtains radio capability information of the terminal apparatus according to the indication information.

For example, the access network apparatus may delete, according to the indication information, the radio capability information of the terminal apparatus stored in the access network apparatus; the access network apparatus may request current radio capability information of the terminal apparatus according to the indication information; or the access network apparatus may update current radio capability information of the terminal apparatus according to the indication information.

Optionally, the receiving, by an access network apparatus, indication information includes:
    receiving, by the access network apparatus, a first message sent by the terminal apparatus, where the first message is used to request to resume a radio resource control connection, and the first message includes the indication information.

For example, the first message may be a radio resume request (RRC connection resume request) message in a radio resource resume (RRC Resume) procedure, or may be another message sent by the terminal apparatus to the access network apparatus in a radio resource resume procedure.

Optionally, in this embodiment of this application, when the terminal apparatus sends the first message to the access network apparatus, the method further includes:
    resuming, by the terminal apparatus, security of a signaling radio bearer and an access stratum, and skipping resuming a data radio bearer.

Optionally, the method further includes: receiving, by the terminal apparatus, a data radio bearer configuration sent by the access network apparatus; and resuming, by the terminal apparatus, the data radio bearer based on the data radio bearer configuration.

It should be noted that the data radio bearer configuration is configured by the access network apparatus based on a new radio capability.

Optionally, the access network apparatus receives a second message sent by the terminal apparatus. The second message is used to indicate that radio resource control connection resume is completed, and the second message includes the indication information.

For example, the second message may be a radio resume complete (RRC connection resume complete) message in a radio resource resume (RRC Resume) procedure, or may be another message sent by the terminal apparatus to the access network apparatus in a radio resource resume procedure.

Optionally, the access network apparatus receives a third message sent by the terminal apparatus. The third message is used to indicate that radio resource control connection is established, and the third message includes the indication information.

For example, the third message may be a radio resource control connection establishment complete message in a radio resource control connection establishment procedure, or another message in a radio resource control connection establishment procedure.

In this embodiment of this application, the terminal apparatus sends the indication information to the access network apparatus. The indication information is used to indicate that the radio capability of the terminal apparatus changes, or is used to instruct the access network apparatus to update the radio capability information of the terminal apparatus.

It should be understood that the indication information may be carried in the first message, the second message, or the third message sent by the terminal apparatus.

Optionally, the receiving, by an access network apparatus, indication information includes:
    receiving, by the access network apparatus, the indication information sent by a core network apparatus, where the indication information is used to indicate that the radio capability of the terminal apparatus changes; and
    updating, by the access network apparatus according to the indication information, the radio capability information stored in the access network apparatus.

Optionally, when the indication information is used to request the current radio capability of the terminal apparatus from the access network apparatus, the method further includes: sending, by the core network apparatus, the indication information, and receiving, by the access network apparatus, an update indication. The update indication is used to instruct the access network apparatus to update the radio capability information of the terminal apparatus, and the update indication and the indication information are carried in a same message.

Optionally, the method further includes:

deleting, by the access network apparatus, the radio capability information of the terminal apparatus that is stored before the access network apparatus obtains the radio capability information from the terminal apparatus.

Optionally, the radio capability includes at least one of system information or a transceiving capability supported by the terminal apparatus. In this embodiment of this application, the core network apparatus may send the indication information to the access network apparatus, where the indication information is used to indicate that the radio capability of the terminal apparatus changes, or is used to request the current radio capability of the terminal apparatus from the access network apparatus.

For example, the core network apparatus sends the indication information to the access network apparatus when the terminal apparatus is in a connected state.

Optionally, the core network apparatus may further send the update indication to the access network apparatus. The update indication is used to instruct the access network apparatus to update the radio capability information of the terminal apparatus, and the update indication and the indication information are carried in a same message.

Figure 10:
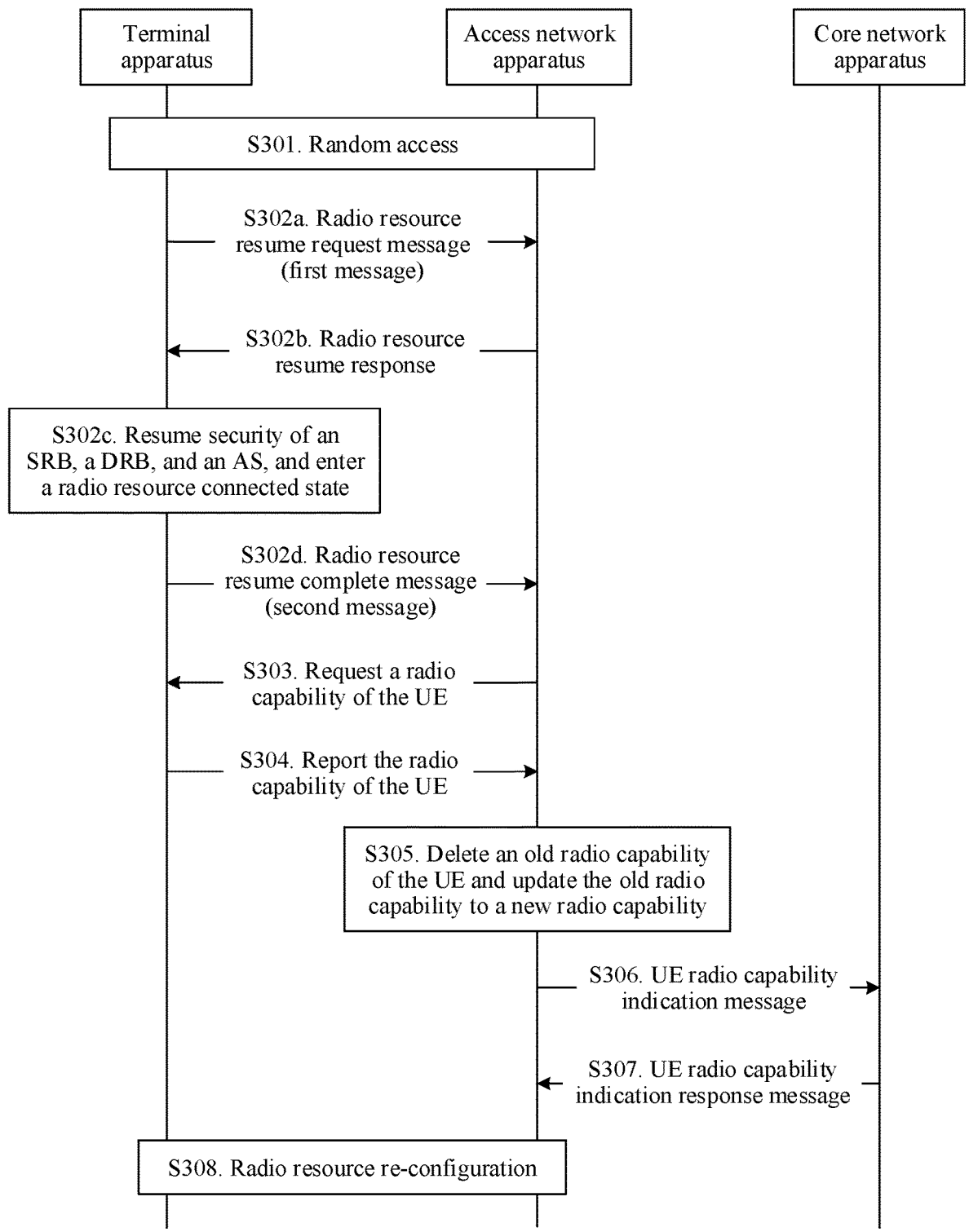
FIG. 10 is a schematic interaction diagram of a method for processing a change in a radio capability of a terminal apparatus according to an embodiment of this application.
Figure 11:
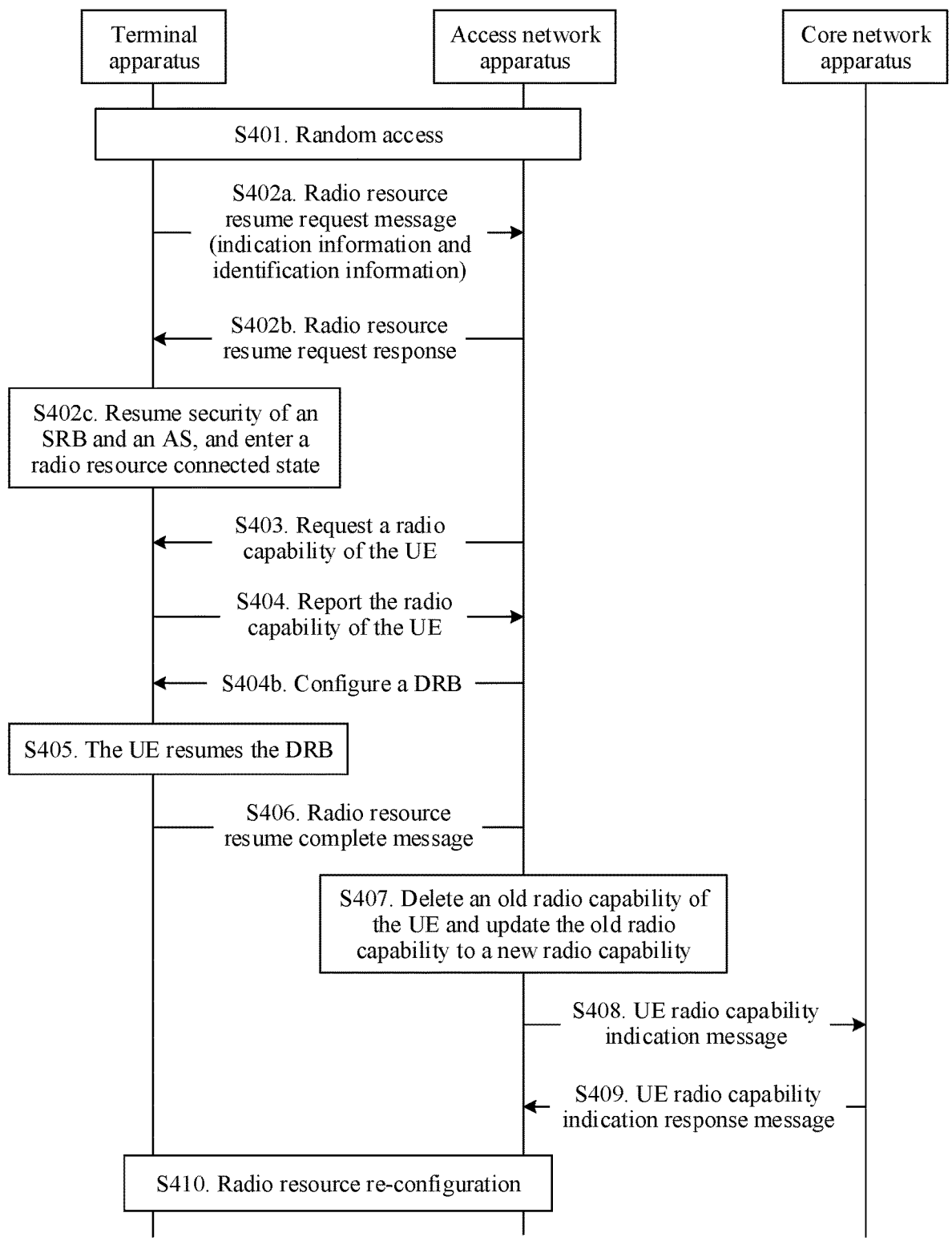
FIG. 11 is a schematic interaction diagram of a method for processing a change in a radio capability of a terminal apparatus according to another embodiment of this application.
Figure 12:
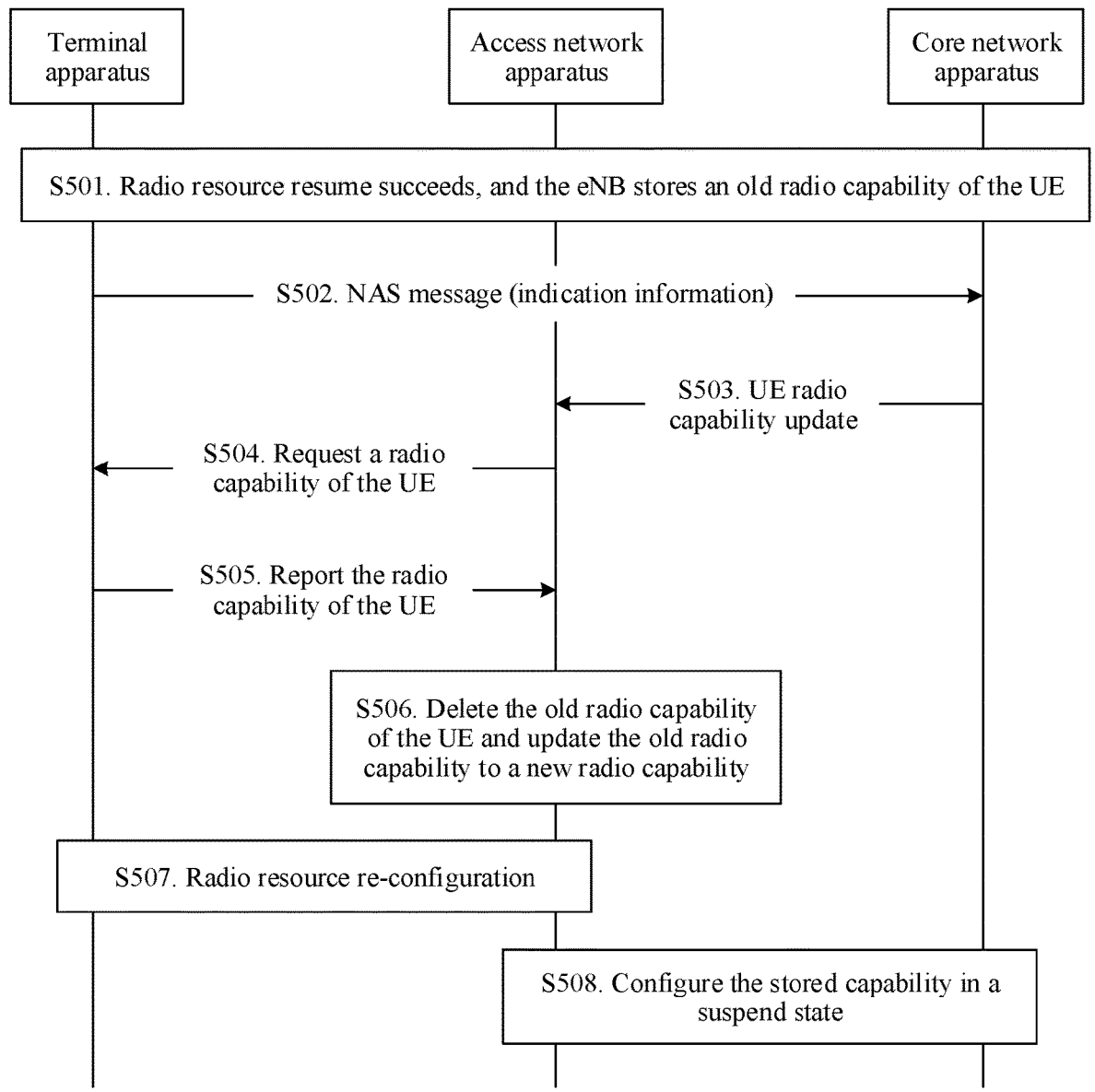
FIG. 12 is a schematic interaction diagram of a method for processing a change in a radio capability of a terminal apparatus according to another embodiment of this application.

According to the foregoing procedures, in this application, FIG. 10 to FIG. 12 are used as examples for description. Refer to subsequent descriptions of FIG. 10 to FIG. 12.

In an embodiment of this application, the access network apparatus receives radio resource resume identification information, and the access network apparatus stores the radio capability information of the terminal apparatus; and the access network apparatus processes a context of the terminal apparatus in the access network apparatus based on the identification information.

Optionally, the processing, by the access network apparatus, a context of the terminal apparatus in the access network apparatus based on the identification information includes: deleting, by the access network apparatus, the radio capability stored before the radio capability is requested from the terminal apparatus; or sending, by the access network apparatus, an instruction message. The instruction message is used to instruct a second access network apparatus to delete the context of the terminal apparatus, and the second access network apparatus is an access network apparatus accessed by the terminal apparatus when the terminal apparatus enters the suspend state.

Optionally, the method further includes: receiving, by the access network apparatus, a third message sent by the terminal apparatus. The third message is used to indicate that radio resource control connection establishment is completed, and the third message includes the indication information.

It should be noted that in this embodiment of this application, the terminal apparatus initiates a radio resource control connection establishment message based on that the terminal apparatus is in the suspend state or in a radio resource control inactive state and that the radio capability of the terminal apparatus changes.

For example, a non-access stratum of the terminal apparatus instructs an access stratum of the terminal apparatus to initiate the radio resource control connection establishment message.

Optionally, the radio resource control connection establishment message includes the radio resource resume identification information.

Optionally, the radio resource control connection establishment message further includes indication information.

The indication information is used to indicate that the radio capability of the terminal apparatus changes, or is used to request the current radio capability of the terminal apparatus from the access network apparatus.

Figure 13:
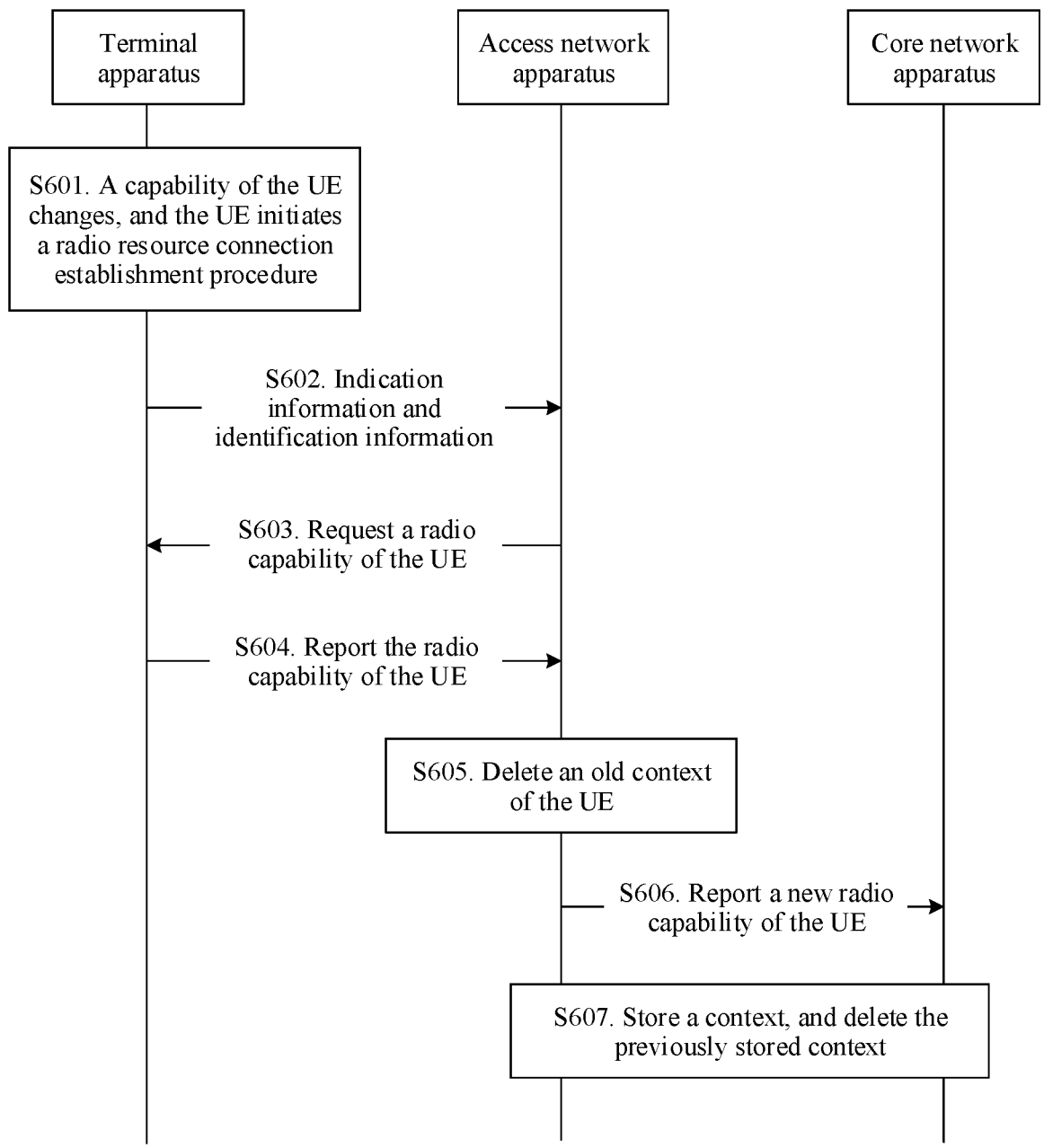
FIG. 13 is a schematic interaction diagram of a method for processing a change in a radio capability of a terminal apparatus according to another embodiment of this application.
Figure 14:
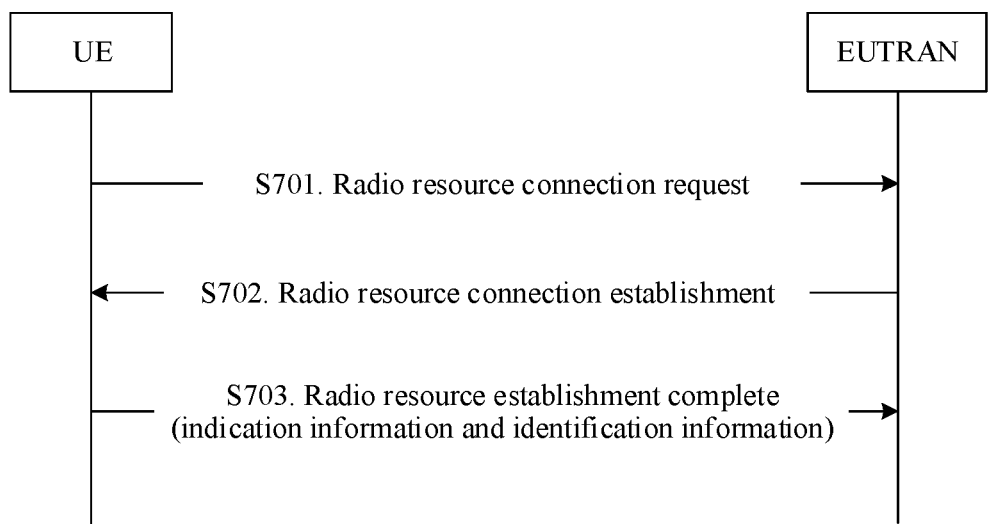
FIG. 14 is a schematic diagram of a radio resource connection establishment procedure initiated by UE.
Figure 15:
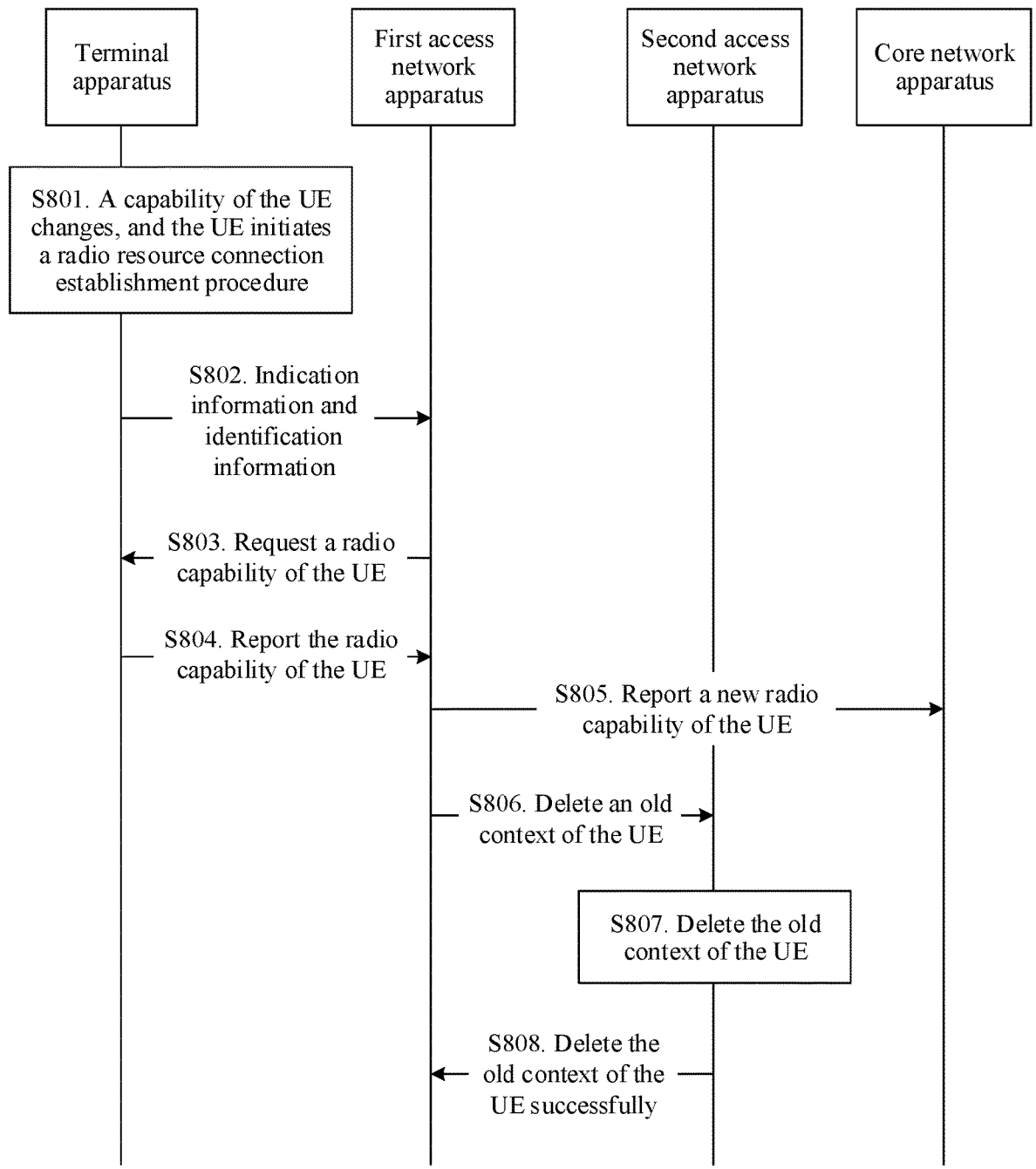
FIG. 15 is a schematic interaction diagram of a method for processing a change in a radio capability of a terminal apparatus according to another embodiment of this application.

According to the foregoing procedures, in this application, FIG. 13 to FIG. 15 are used as examples for description. Refer to subsequent descriptions of FIG. 13 to FIG. 15.

For example, FIG. 10 is a schematic diagram of a method for processing a change in a radio capability of a terminal apparatus according to an embodiment of this application.

It should be understood that, in FIG. 10, an access network apparatus may be an eNB in a 4G system, or may be a gNB in a 5G system; and a core network apparatus may be an MME entity in the 4G system, or may be an AMF entity in the 5G system. This is not limited in this application.

It should be noted that, the method for processing a change in a radio capability of a terminal apparatus shown in FIG. 10 is obtained by altering an RRC resume procedure, and an RRC resume message may include indication information indicating that a radio capability of UE changes.

S301. A terminal apparatus initiates a random access procedure to the access network apparatus.

S302a. The UE sends a radio resource connection resume request (RRC connection resume request) message to the access network apparatus, to resume a connection. The message may include UE radio capability changed indication (UE capability changed indication) information and connection resume identification (Resume ID) information.

The UE capability changed indication may be used to indicate that a radio capability of the UE changes.

S302b. The access network apparatus sends a radio resource connection resume message (RRC connection resume) to the terminal apparatus.

S302c. The UE resumes security of all of an SRB, a DRB, and an AS, and the UE enters an RRC-connected state.

S302d. The UE responds to the access network apparatus by using a radio resource connection resume complete message, and determines that an RRC connection has been successfully resumed.

Optionally, in this embodiment of this application, the radio resource connection resume complete message may also carry the indication information. The indication information may be used to indicate that a first radio capability of the terminal apparatus changes, or may be used to instruct the access network apparatus to delete or update a context of a first radio capability of the terminal apparatus.

S303. The access network apparatus requests the radio capability of the UE from the UE.

It should be noted that in this embodiment of this application, the UE requests the radio capability of the UE from the UE according to the indication information. In other words, the indication information may be considered as a trigger condition for requesting the radio capability of the UE.

S304. The UE reports the radio capability of the UE to the access network apparatus.

For example, the radio capability of the UE in a suspend state is the first radio capability, and a current radio capability of the UE may be a second radio capability.

S305: The access network apparatus deletes, according to the indication information of the UE in step S302a, an old context of the radio capability of the UE stored in the access network apparatus, and updates the context to a new context of the radio capability of the UE.

It should be noted that, in this embodiment of this application, the access network apparatus may first delete the old radio capability information of the UE, and then request the radio capability of the terminal apparatus from the terminal apparatus.

For example, when the UE is in a suspend state, the first radio capability changes, and a context of the first radio capability of the UE is stored in the access network apparatus. When the radio capability of the UE changes to a current second radio capability, the context of the first radio capability stored in the UE needs to be deleted, and the context of the radio capability of the UE stored in the access network apparatus needs to be updated based on the second radio capability.

It should be understood that in this embodiment of this application, when the first radio capability of the UE changes, the access network apparatus obtains, according to the indication information, the current radio capability of the UE, for example, the second radio capability. The access network apparatus may delete the context of the first radio capability of the UE, but does not delete a context other than the context of the first radio capability of the UE.

S306. The access network apparatus sends a UE radio capability indication (capability info indication) message to the core network apparatus, to send a new radio capability of the UE to the core network apparatus.

S307. The core network apparatus sends a radio capability indication message response to the access network apparatus.

S308. The access network apparatus reconfigures an RRC connection based on the updated radio capability of the UE.

In this embodiment of this application, the UE capability changed indication information may be uploaded in the RRC connection resume request message or the RRC connection resume complete message, and a TAU procedure does not need to be triggered to report an indication of the change in the radio capability of the UE, so that the access network apparatus and the core network apparatus can earlier learn that the radio capability of the UE changes, to perform adjustment in a timely manner, thereby reducing signaling overheads of the TAU procedure and saving system resources.

It should be understood that, sequence numbers of the foregoing processes do not mean execution sequences. The execution sequences of the processes should be determined based on functions and internal logic of the processes, and should not be construed as any limitation on the implementation processes of the embodiments of this application.

According to the method for processing a change in a radio capability of a terminal apparatus shown in FIG. 10, the radio capability of the UE changes, and the UE resumes security of all of the SRB, the DRB, and the AS. The radio capability of the UE changes but the access network apparatus does not obtain information indicating that the radio capability of the UE changes, that is, the access network apparatus may not know that the radio capability of the UE changes. In this case, the DRB may fail to be established. FIG. 11 shows a schematic diagram of a method for processing a change in a radio capability of a terminal apparatus, and a problem that a DRB may fail to be established is avoided.

It should be understood that, in FIG. 11, an access network apparatus may be an eNB in a 4G system, or may be a gNB in a 5G system; and a core network apparatus may be an MME entity in the 4G system, or may be an AMF entity in the 5G system. This is not limited in this application.

S401. A terminal apparatus initiates a random access procedure to the access network apparatus.

S402a. The UE sends a radio resource connection resume request (RRC connection Resume request) message to the access network apparatus, to resume a connection. The message may include UE radio capability changed indication (UE capability changed indication) information and connection resume identification (Resume ID) information.

The UE capability changed indication may be used to indicate that a radio capability of the UE changes.

S402b. The access network apparatus sends a radio resource connection resume (RRC connection resume) response to the terminal apparatus.

S402c. The UE resumes security of all of an SRB and an AS, but the UE does not establish a DRB temporarily because a radio capability of the UE changes.

S403. The access network apparatus requests the radio capability of the UE from the UE.

It should be noted that in this embodiment of this application, the UE requests the radio capability of the UE from the UE according to the indication information. In other words, the indication information may be considered as a trigger condition for requesting the radio capability of the UE.

S404. The UE reports the radio capability of the UE to the access network apparatus.

For example, a radio capability of the UE when the UE enters a suspend state is a first radio capability, and a current radio capability of the UE may be a second radio capability.

S404b. The access network apparatus configures a DRB configuration of the UE based on the radio capability of the UE and a status of the access network apparatus.

S405. The UE resumes, based on the DRB configuration of the access network apparatus, that the DRB enters a radio resource connection state.

S406. The UE responds to the access network apparatus by using a radio resource connection resume complete (RRC connection Resume complete) message, and determines that an RRC connection has been successfully resumed.

S407: The access network apparatus deletes, according to the indication information of the UE in step S402a, an old context of the radio capability of the UE stored in the access network apparatus, and updates the context to a new context of the radio capability of the UE.

For example, when the UE is in a suspend state, the first radio capability changes, and a context of the first radio capability of the UE is stored in the access network apparatus. When the radio capability of the UE changes to the current second radio capability, the context of the first radio capability stored in the UE needs to be deleted, and the context of the radio capability of the UE stored in the access network apparatus needs to be updated based on the second radio capability.

It should be understood that in this embodiment of this application, when the first radio capability of the UE changes, the access network apparatus obtains, according to the indication information, the current radio capability of the UE, for example, the second radio capability. The access network apparatus may delete the context of the first radio capability of the UE, but does not delete another context other than the context of the first radio capability of the UE.

S408. The access network apparatus sends a UE radio capability indication (capability info indication) message to the core network apparatus, to send a new radio capability of the UE to the core network apparatus.

S409. The core network apparatus sends a radio capability indication message response to the access network apparatus.

S410. The access network apparatus reconfigures an RRC connection based on the updated radio capability of the UE.

In this embodiment of this application, the UE capability changed indication information may be uploaded in the RRC connection resume request message or the RRC connection resume complete message, and a TAU procedure does not need to be triggered to report an indication of the change in the radio capability of the UE, so that the access network apparatus and the core network apparatus can earlier learn that the radio capability of the UE changes, to perform adjustment in a timely manner, thereby reducing signaling overheads of the TAU procedure and saving system resources. In addition, the access network apparatus establishes the DRB after obtaining the radio capability of the UE, thereby avoiding a case in which the DRB fails to be established.

It should be understood that, sequence numbers of the foregoing processes do not mean execution sequences. The execution sequences of the processes should be determined based on functions and internal logic of the processes, and should not be construed as any limitation on the implementation processes of the embodiments of this application.

In the methods for processing a change in a radio capability of a terminal apparatus shown in FIG. 10 and FIG. 11, the RRC resume message includes the indication information indicating that the radio capability of UE changes. The access network apparatus requests the radio capability of the UE from the UE according to the indication information of the UE. This resolves a problem that the access network apparatus stores a context of a radio capability of the UE in a suspend/resume mechanism when the radio capability of the UE changes in a suspend state, and if the radio capability of the UE changes, the access network apparatus still processes RRC resume of the UE based on the radio capability of the UE stored in the access network apparatus, causing an error to the resume.

However, when the radio capability of the UE changes, the access network apparatus still processes the RRC resume of the UE based on the radio capability of the UE stored in the access network apparatus, and the RRC resume may alternatively succeed. In this case, the access network needs to be instructed to delete the old context of the UE stored in the access network. For the suspend/resume mechanism, there is no manner in which the core network apparatus instructs the access network apparatus to delete the context of the UE.

FIG. 12 is a schematic diagram of a method for processing a change in a radio capability of a terminal apparatus according to an embodiment of this application.

It should be understood that, in FIG. 12, an access network apparatus may be an eNB in a 4G system, or may be a gNB in a 5G system; and a core network apparatus may be an MME entity in the 4G system, or may be an AMF entity in the 5G system. This is not limited in this application.

Optionally, S501 is for RRC resume. A capability of UE changes, but the RRC resume still succeeds, and the access network apparatus still stores an old UE capability.

Optionally, S501 is for RRC connection establishment. A capability of UE changes, and a radio resource control connection is established through the RRC connection establishment.

Specifically, a first radio capability of the UE changes, and the UE is in an RRC suspend state. The UE determines to initiate a conventional RRC connection establishment procedure rather than trigger an RRC resume procedure.

For example, the first radio capability of the UE changes, and the UE is in the RRC suspend state. The UE determines to trigger an AS layer to initiate the conventional RRC connection establishment procedure by using a NAS layer rather than trigger the RRC resume procedure.

It should be understood that, in the RRC connection establishment procedure, UE capability changed indication information may not be carried, and the UE sends indication information to an MME by using a NAS in a TAU after the radio resource control connection is successfully established. It should be understood that, for an RRC resume procedure, refer to steps in FIG. 10 and FIG. 11.

S502. A NAS message sent by the UE includes a UE capability changed indication.

S503: The core network apparatus notifies the access network apparatus that the capability of the UE is updated, and the stored context of the old radio capability of the UE should be deleted, or a current radio capability of the UE should be requested from the access network apparatus.

Optionally, the core network apparatus may send the indication information to the access network apparatus. The indication information is used to indicate that a radio capability of the terminal apparatus changes, and the access network apparatus updates the radio capability of the terminal apparatus according to the indication information.

It should be noted that, in this embodiment of this application, the core network apparatus may send the indication information to the access network apparatus, where the indication information is used to indicate that the radio capability of the terminal apparatus changes; and the access network apparatus may update, according to the indication information, the radio capability information stored in the access network apparatus. Alternatively, the core network apparatus may send the indication information to the access network apparatus, where the indication information is used to request a current radio capability of the terminal apparatus from the access network apparatus; and the core network apparatus may further send an update indication to the access network apparatus, where the update indication is used to instruct the access network apparatus to update radio capability information of the terminal apparatus, and the indication information and the update indication may be carried in a same message or carried in different messages.

Optionally, the core network apparatus uses a new message to indicate that the access network apparatus needs to delete or update stored old context of the UE, for example, delete a context of a first radio capability of the UE.

Optionally, the access network apparatus uses an existing message to indicate that the access network apparatus needs to delete a stored old context of the UE, for example, delete a context of a first radio capability of the UE.

For example, an information element is added to a connection establishment indication message, and used to instruct the access network apparatus to delete or update the old context of the UE.

Specifically, in the prior art, for the connection establishment indication message, if the message includes a UE radio capability IE, the access network apparatus stores the radio capability of the UE. If the message does not include a UE radio capability IE, the access network apparatus needs to obtain and report the radio capability of the UE to the core network apparatus.

A problem in the prior art is that, if the connection establishment indication message does not include the UE radio capability IE, when the access network apparatus finds that the access network apparatus stores the first radio capability (stored when the UE is previously suspended) of the UE, the access network apparatus does not obtain the current radio capability of the UE from the UE, but reports the first radio capability to the core network apparatus.

In this embodiment of this application, an information element may be added to the connection establishment indication message, and the information element may be indication information.

For example, the indication information may directly instruct the access network apparatus to delete the old context of the UE, for example, delete the context of the first radio capability of the UE. For example, the indication information may indicate that the radio capability of the UE changes.

For example, the indication information may instruct the access network apparatus to update an existing context of the UE. In this case, the core network apparatus needs to determine that the radio capability of the UE changes, and the core network apparatus stores a context of the UE.

If the core network apparatus does not send the indication information to the access network apparatus, a processing mechanism of the access network apparatus may also be changed. The access network apparatus determines that the access network apparatus stores the context of the UE, and updates or deletes the stored context after receiving a message of the core network apparatus.

Optionally, in a downlink non-access stratum message sent by the core network apparatus to the access network apparatus or a UE transmission message sent by the core network apparatus to the access network apparatus, the access network apparatus is instructed to update or delete the context of the UE.

For example, if the downlink non-access stratum message includes a UE radio capability request (that is, a UE capability info request IE is set to requested), the access network apparatus needs to obtain and report the radio capability of the UE to the core network apparatus.

Alternatively, if the downlink non-access stratum message includes a UE radio capability update/updated (that is, a UE capability info request IE is set to update/updated), the access network apparatus needs to obtain and report the radio capability of the UE to the core network apparatus.

Alternatively, if the downlink non-access stratum message includes both a UE radio capability request and a UE radio capability update/updated (that is, a UE capability info request IE is set to update/updated), the access network apparatus needs to obtain and report the radio capability of the UE to the core network apparatus.

S504. The access network apparatus requests the radio capability of the UE from the UE.

It should be noted that in this embodiment of this application, a RAN requests the radio capability of the UE from the UE according to the indication information. In other words, the indication information may be considered as a trigger condition for requesting the radio capability of the UE.

S505. The UE reports the radio capability of the UE to the access network apparatus.

For example, a radio capability of the UE when the UE enters a suspend state is the first radio capability, and a current radio capability of the UE may be a second radio capability.

S506: The access network apparatus deletes an old context of the radio capability of the UE stored in the access network apparatus, and updates the context to a new context of the radio capability of the UE.

For example, when the UE is in a suspend state, the first radio capability changes, and a context of the first radio capability of the UE is stored in the access network apparatus. When the radio capability of the UE changes to the current second radio capability, the context of the first radio capability stored in the UE needs to be deleted, and the context of the radio capability of the UE stored in the access network apparatus needs to be updated based on the second radio capability.

It should be understood that in this embodiment of this application, when the first radio capability of the UE changes, the access network apparatus obtains, according to the indication information, the current radio capability of the UE, for example, the second radio capability. The access network apparatus may delete the context of the first radio capability of the UE, but does not delete another context other than the context of the first radio capability of the UE.

It should be noted that in this embodiment of this application, the RRC resume of the UE has succeeded, that is, it indicates that the context of the UE is reused in an RRC resume process. In this case, the context of the first radio capability retained in the access network apparatus may be updated based on the updated radio capability such as the second radio capability. Alternatively, the conventional radio resource connection establishment (RRC connection establishment) procedure of the UE has succeeded.

S507. The access network apparatus reconfigures an RRC connection based on the updated radio capability of the UE.

S508. The core network apparatus reconfigures the capability stored in the access network apparatus in the suspend state.

In this embodiment of this application, the core network apparatus may instruct the access network apparatus to delete the old context of the UE, thereby resolving a problem that when the radio capability of the UE changes, currently, in a suspend/resume mechanism, the core network apparatus does not instruct the access network apparatus to delete the context of the UE.

It should be understood that, sequence numbers of the foregoing processes do not mean execution sequences. The execution sequences of the processes should be determined based on functions and internal logic of the processes, and should not be construed as any limitation on the implementation processes of the embodiments of this application.

FIG. 10 to FIG. 12 show the methods for processing a change in a radio capability of a terminal apparatus in an RRC resume procedure when UE is in a suspend state and a first radio capability of the UE changes. In this embodiment of this application, when the UE is in the suspend state, the UE may determine not to initiate an RRC resume procedure, but initiate a conventional radio resource connection establishment (RRC connection establishment) procedure.

The following provides descriptions by using examples according to FIG. 13 to FIG. 15. It should be understood that the following describes specific implementations of the embodiments of this application in more detail with reference to specific examples. It should be noted that the examples below are merely intended to help a person skilled in the art understand the embodiments of this application, instead of limiting the embodiments of this application to a specific value or a specific scenario shown in the examples. A person skilled in the art can apparently make various equivalent modifications or changes based on the examples provided below, and such modifications and changes also fall within the scope of the embodiments of this application.

FIG. 13 is an interaction flowchart of a method for processing a change in a radio capability of a terminal apparatus according to an embodiment of this application.

It should be noted that, in FIG. 13, an access network apparatus may be an eNB in a 4G system, or may be a gNB in a 5G system; and a core network apparatus may be an MME entity in the 4G system, or may be an AMF entity in the 5G system. This is not limited in this application.

It should be understood that, in this embodiment of this application, when UE is in an RRC suspend state or an RRC inactive state, a radio capability of the UE changes, and the UE determines to initiate a conventional RRC connection setup procedure rather than trigger an RRC resume procedure. In this manner, the access network apparatus can update the capability of the UE in a corresponding manner. In addition, the access network apparatus deletes an old context of the UE that is stored in the access network apparatus.

S601. A first radio capability of the UE changes, and the UE is in the RRC suspend state. The UE determines to initiate the conventional RRC connection establishment procedure rather than trigger the RRC resume procedure.

For example, the first radio capability of the UE changes, and the UE is in the RRC suspend state. The UE determines to trigger an AS layer to initiate the conventional RRC connection establishment procedure by using a NAS layer rather than trigger the RRC resume procedure.

S602. The UE initiates the conventional RRC connection establishment procedure, and carries at least one of indication information and radio resource resume identification (UE capability changed indication, RRC Resume ID) information.

Specifically, FIG. 14 is a schematic diagram of the conventional radio resource connection establishment (RRC connection establishment) procedure initiated by the UE. The procedure includes the following steps.

S701. The UE initiates a radio resource connection establishment request (RRC connection request) message, to request to establish an RRC connection.

S702. An EUTRAN sends a radio resource connection establishment (RRC connection setup) message, to instruct the UE to establish the RRC connection.

S703. The UE sends a radio resource connection establishment complete (RRC Connection Setup Complete) message, where the message may carry at least one of the indication information and the radio resource resume identification (UE capability changed indication, RRC Resume ID) information.

S603. The access network apparatus requests the radio capability of the UE from the UE.

It should be noted that in this embodiment of this application, the UE requests the radio capability of the UE from the UE according to the indication information. In other words, the indication information may be considered as a trigger condition for requesting the radio capability of the UE.

S604. The UE reports the radio capability of the UE to the access network apparatus.

For example, the radio capability of the UE in the suspend state is the first radio capability, and a current radio capability of the UE may be a second radio capability.

S605: The access network apparatus deletes, according to the identification information (RRC Resume ID) provided by the UE, an old context of the UE that is stored in the access network apparatus.

S606. The access network apparatus reports a new radio capability of the UE to the core network apparatus.

S607. The core network apparatus stores a new context, and deletes the previously stored context. In this embodiment of this application, the UE in the RRC suspend state may directly initiate the RRC connection establishment procedure rather than initiating the RRC resume procedure, thereby avoiding a failure of the RRC resume procedure caused by the change in the radio capability of the UE. In addition, UE capability changed indication information is carried in an RRC establishment message, so that the access network apparatus and the core network apparatus can learn of the change in the radio capability of the UE earlier, and a TAU procedure does not need to be performed to notify the change. The resume ID is carried in the RRC connection establishment procedure, to instruct the access network apparatus to delete the corresponding context of the UE.

It should be understood that, sequence numbers of the foregoing processes do not mean execution sequences. The execution sequences of the processes should be determined based on functions and internal logic of the processes, and should not be construed as any limitation on the implementation processes of the embodiments of this application.

In an example, when the UE is in the RRC suspend state, the UE may move to coverage of a new access network apparatus to initiate a conventional radio resource connection establishment procedure (RRC connection setup). In this case, the new access network apparatus needs to instruct an old access network apparatus to delete the context information of the UE. It should be understood that the old access network apparatus may be an access network apparatus accessed by the UE before the UE is in the RRC suspend state. The following describes specific implementations of the embodiments of this application in more detail with reference to specific examples. It should be noted that the examples below are merely intended to help a person skilled in the art understand the embodiments of this application, instead of limiting the embodiments of this application to a specific value or a specific scenario shown in the examples. A person skilled in the art can apparently make various equivalent modifications or changes based on the examples provided below, and such modifications and changes also fall within the scope of the embodiments of this application.

For example, FIG. 15 is an interaction flowchart of a method for processing a change in a radio capability of a terminal apparatus according to an embodiment of this application.

It should be noted that, in FIG. 15, an access network apparatus may be an eNB in a 4G system, or may be a gNB in a 5G system; and a core network apparatus may be an MME entity in the 4G system, or may be an AMF entity in the 5G system. This is not limited in this application.

It should be understood that, in FIG. 15, a first access network apparatus may be a new access network apparatus after UE moves, and a second access network apparatus may be an access network apparatus accessed by the UE when the UE enters an RRC suspend state, that is, an old access network apparatus accessed by the UE before the UE moves.

S801. A first radio capability of the UE changes, and the UE is in the RRC suspend state. The UE determines to initiate a conventional RRC connection establishment procedure rather than trigger an RRC resume procedure.

S802. The UE initiates the conventional RRC connection establishment procedure, and carries at least one of indication information and radio resource resume identification (UE capability changed indication, RRC Resume ID) information.

For example, as shown in FIG. 14, the UE sends a radio resource connection establishment complete (RRC connection setup complete) message. The message may carry the indication information and the radio resource resume identification (UE capability changed indication, RRC Resume ID) information.

S803. The first access network apparatus requests a radio capability of the UE from the UE.

It should be noted that in this embodiment of this application, the UE requests the radio capability of the UE from the UE according to the indication information. In other words, the indication information may be considered as a trigger condition for requesting the radio capability of the UE.

S804. The UE reports the radio capability of the UE to the first access network apparatus.

For example, the radio capability of the UE in the suspend state is the first radio capability, and a current radio capability of the UE may be a second radio capability.

S805. The access network apparatus reports a new radio capability of the UE to the core network apparatus.

S806: The first access network apparatus instructs, according to the RRC resume ID provided by the UE, the second access network apparatus to delete an old context of the UE that is stored in the second access network apparatus.

It should be understood that, when the UE initiates the conventional RRC connection establishment procedure, the access network apparatus does not need to use context information of the UE. Therefore, the context information of the UE that is retained before the UE is in the suspend state needs to deleted, to release a resource.

S807: The second access network apparatus deletes, according to the identification information (RRC Resume ID) provided by the first access network apparatus, the old context of the UE that is stored in the second access network apparatus.

S808. The second access network apparatus sends a response message to the first access network apparatus, where the response message is used to indicate that the first access network apparatus and the second access network apparatus successfully delete the old context of the UE.

In this embodiment of this application, the UE in the RRC suspend state may directly initiate the RRC connection establishment procedure rather than initiating the RRC resume procedure, thereby avoiding a failure of the RRC resume procedure caused by the change in the radio capability of the UE. In addition, UE capability changed indication information is carried in an RRC establishment message, so that the access network apparatus and the core network apparatus can learn of the change in the radio capability of the UE earlier, and a TAU procedure does not need to be performed to notify the change. The resume ID is carried in the RRC connection establishment procedure, to instruct the second access network apparatus to delete the corresponding context of the UE.

It should be understood that, sequence numbers of the foregoing processes do not mean execution sequences. The execution sequences of the processes should be determined based on functions and internal logic of the processes, and should not be construed as any limitation on the implementation processes of the embodiments of this application.

The foregoing describes in detail the methods for processing a change in a radio capability of a terminal apparatus according to the embodiments of this application. In this application, when the terminal apparatus is in the RRC suspend state, the first radio capability of the UE changes, and the terminal apparatus may establish a radio resource connection by using the RRC resume procedure or the conventional RRC connection establishment procedure. When the UE resumes the radio resource connection by using the RRC resume procedure, the access network apparatus deletes, according to the indication information, the first radio capability information of the UE that is retained in the access network apparatus. When the UE establishes the radio resource connection by using the conventional RRC connection setup procedure, the access network apparatus deletes, based on the radio resource resume identification (RRC Resume ID) information, the context of the UE that is retained in the access network apparatus, thereby improving communication efficiency of the UE after the radio resource connection is resumed in the suspend state. It should be understood that the terminal apparatus and the access network apparatus in the embodiments of this application may perform the methods in the foregoing embodiments of this application. In other words, for specific working processes of the following products, refer to corresponding processes in the foregoing method embodiments.

Figure 16:
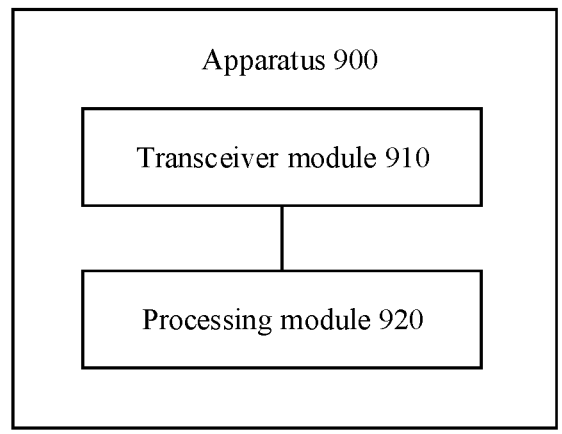
FIG. 16 is a schematic block diagram of an apparatus for processing a change in a radio capability of a terminal apparatus according to an embodiment of this application.

FIG. 16 is a schematic structural diagram of an apparatus for processing a change in a radio capability of a terminal apparatus according to an embodiment of this application. The apparatus 900 in FIG. 16 may correspondingly implement the steps or operations performed by the access network apparatus in the foregoing descriptions, and may include a transceiver module 910 and a processing module 920.

In an embodiment, the transceiver module 910 is configured to receive indication information, where the apparatus 900 stores radio capability information of a terminal apparatus, and the indication information is used to indicate that a radio capability of the terminal apparatus changes, or is used to request a current radio capability of the terminal apparatus from the access network apparatus; and the processing module 920 is configured to obtain radio capability information of the terminal apparatus according to the indication information.

In this embodiment of this application, when the radio capability of the UE in a suspend state changes, the access network apparatus processes, according to the indication information, context information of the radio capability of the terminal apparatus that is retained in the access network apparatus, so that the terminal apparatus can successfully resume a radio resource connection, thereby improving communication efficiency.

Optionally, the transceiver module 910 is specifically configured to:
receive a first message sent by the terminal apparatus, where the first message is used to request to resume a radio resource of the terminal apparatus in a suspend state, and the first message includes the indication information.

Optionally, the transceiver module 910 is specifically configured to:
receive a second message sent by the terminal apparatus, where the second message is used to instruct the terminal apparatus to complete resume of a radio resource of the terminal apparatus in a suspend state, and the second message includes the indication information.

Optionally, the transceiver module 910 is specifically configured to:
receive a third message sent by the terminal apparatus, where the third message is used to indicate that radio resource control connection is established, and the third message includes the indication information.

Optionally, the transceiver module 910 is specifically configured to:

receive a fourth message sent by the core network apparatus, where the fourth message is used to instruct the access network apparatus to delete or update the first radio capability information in the access network apparatus, the fourth message includes the indication information, and the core network apparatus is a mobility management entity or an access and mobility management function entity.

For example, the fourth message may be a new message used by the core network apparatus to indicate that the access network apparatus needs to delete or update a stored old context of the UE.

For example, the fourth message may be an existing message used by the core network apparatus to indicate that the access network apparatus needs to delete or update a stored old context of the UE.

For example, the core network apparatus instructs, by adding an information element to a connection establishment indication) message, the access network apparatus to delete or update the old context of the UE.

For example, the fourth message may be a downlink non-access stratum (downlink NAS transport) message or a terminal apparatus transfer (UE information transfer) message sent by the core network apparatus to the access network apparatus, to indicate that the access network apparatus needs to delete a stored old context of the UE.

Optionally, the processing module 920 is further configured to:

receive, by using the transceiver module 910, the indication information sent by the core network apparatus, and update, according to the indication information, the radio capability information stored in the access network apparatus.

Optionally, the transceiver module 910 is further configured to:

receive an update indication, where the update indication is used to instruct the access network apparatus to update the radio capability information of the terminal apparatus, and the indication information is sent by the core network apparatus.

Optionally, the processing module 920 is specifically configured to:

delete the radio capability information of the terminal apparatus that is stored before the processing module obtains the radio capability information from the terminal apparatus.

Optionally, the processing module 920 is specifically configured to:

send a request message of the radio capability to the terminal apparatus according to indication information by using the transceiver module 910; and update the radio capability information of the terminal apparatus based on a second radio capability, where the second radio capability is a current radio capability of the terminal apparatus.

Optionally, the radio capability includes at least one of system information or a transceiving capability supported by the terminal apparatus.

In an embodiment, the transceiver module 910 is configured to receive radio resource resume identification information, where the apparatus 900 stores radio capability information of a terminal apparatus; and the processing module 920 processes a context of the terminal apparatus in the access network apparatus based on the identification information.

Optionally, the processing module 920 is specifically configured to:

delete the radio capability stored before the radio capability is requested from the terminal apparatus; or the access network apparatus sends an indication message, where the indication message is used to instruct a second access network apparatus to delete the context of the terminal apparatus, and the second access network apparatus is an access network apparatus accessed by the terminal apparatus when the terminal apparatus enters the suspend state.

Optionally, the transceiver module 910 is further configured to:

receive a third message sent by the terminal apparatus, where the third message is used to indicate that a radio resource control connection is established, and the fourth message includes the identification information.

It may be understood that, for implementations, interaction, and the like of the modules in the apparatus 900 in this embodiment of this application, refer to related descriptions in the method embodiments.

Figure 17:
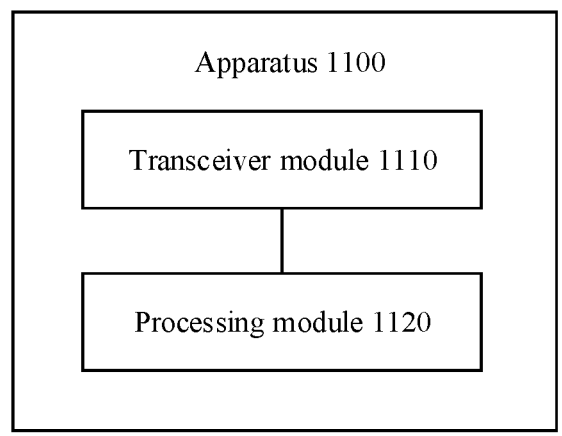
FIG. 17 is a schematic block diagram of an apparatus for processing a change in a radio capability of a terminal apparatus according to an embodiment of this application.

FIG. 17 is a schematic structural diagram of an apparatus for processing a change in a radio capability of a terminal apparatus according to an embodiment of this application. The apparatus 1100 in FIG. 17 may correspondingly implement the steps or operations performed by the terminal apparatus in the foregoing descriptions, and may include a transceiver module 1110 and a processing module 1120.

In an embodiment, the transceiver module 1110 is configured to send indication information to an access network apparatus, where the indication information is used to indicate that a radio capability of the terminal apparatus changes, or is used to instruct the access network apparatus to update radio capability information of the terminal apparatus.

The apparatus 1100 may further include the processing module 1120, configured to generate the indication information or determine the indication information.

In this embodiment of this application, when the radio capability of the UE in a suspend state changes, the access network apparatus processes, according to the indication information, context information of the radio capability of the terminal apparatus that is retained in the access network apparatus, so that the terminal apparatus can successfully resume a radio resource connection, thereby improving communication efficiency.

Optionally, the transceiver module 1110 is specifically configured to:

send a first message to the access network apparatus, where the first message is used to request to resume a radio resource control connection, and the first message includes the indication information.

Optionally, the transceiver module 1110 is specifically configured to:

send a second message to the access network apparatus, where the second message is used to indicate that radio resource control connection resume is completed, and the second message includes the indication information.

Optionally, the transceiver module 1110 is specifically configured to:

send a third message to the access network apparatus, where the third message is used to indicate that a radio resource control connection is established, and the third message includes the identification information.

Optionally, the processing module 1120 is further configured to:

resume security of a signaling radio bearer and an access stratum, and skip resuming a data radio bearer.

Optionally, the processing module 1120 is further configured to:

receive, by using the transceiver module 1110, a data radio bearer configuration sent by the access network apparatus; and when the transceiver module is configured to receive the data radio bearer configuration sent by the access network apparatus, the processing module is configured to resume security of the data radio bearer based on the data radio bearer configuration.

In an embodiment, the processing module 1120 is configured to initiate, by using the transceiver module 1110, a radio resource control connection establishment message based on that the terminal apparatus is in a suspend state and a radio capability of the terminal apparatus changes, or that the terminal apparatus is in a radio resource control inactive state and a radio capability of the terminal apparatus changes.

Optionally, the processing module 1120 is specifically configured to:

instruct, by using a non-access stratum, an access stratum of the terminal apparatus to initiate the radio resource control connection establishment message.

Optionally, the radio resource control connection establishment message includes the radio resource resume identification information.

Optionally, the radio resource control connection establishment message further includes indication information, where the indication information is used to indicate that the radio capability of the terminal apparatus changes, or is used to request the current radio capability of the terminal apparatus from the access network apparatus.

It may be understood that, for implementations, interaction, and the like of the modules in the apparatus 1100 in this embodiment of this application, refer to related descriptions in the method embodiments.

Figure 18:
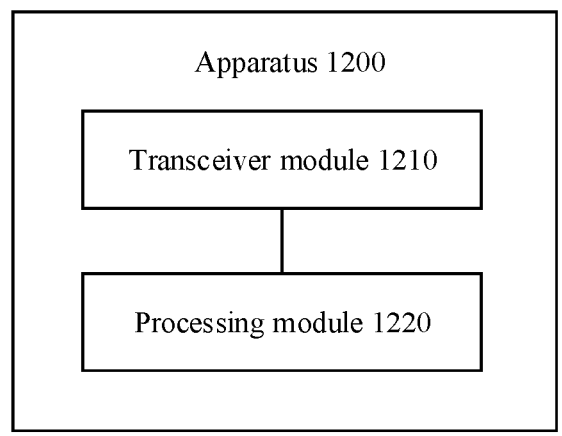
FIG. 18 is a schematic block diagram of an apparatus for processing a change in a radio capability of a terminal apparatus according to an embodiment of this application.

FIG. 18 is a schematic structural diagram of an apparatus for processing a change in a radio capability of a terminal apparatus according to an embodiment of this application. The apparatus 1200 in FIG. 19 may correspondingly implement the steps or operations performed by the core network apparatus in the foregoing descriptions, and may include a transceiver module 1210 and a processing module 1220.

The transceiver module 1210 is configured to send indication information to an access network apparatus, where the indication information is used to indicate that a radio capability of a terminal apparatus changes, or is used to request a current radio capability of the terminal apparatus from the access network apparatus.

The apparatus 1200 may further include the processing module 1220, configured to generate the indication information or determine the indication information.

Optionally, the processing module 1220 is further configured to: when the terminal apparatus is in a connected state, send the indication information to the access network apparatus by using the transceiver module.

Optionally, when the indication information is used to request the current radio capability of the terminal apparatus from the access network apparatus, the transceiver module 1210 is further configured to send an update indication to the access network apparatus, where the update indication is used to instruct the access network apparatus to update radio capability information of the terminal apparatus.

Optionally, when the indication information is used to indicate that the radio capability of the terminal apparatus changes, the indication information is further used to instruct the access network apparatus to update the radio capability of the terminal apparatus according to the indication information.

Figure 19:
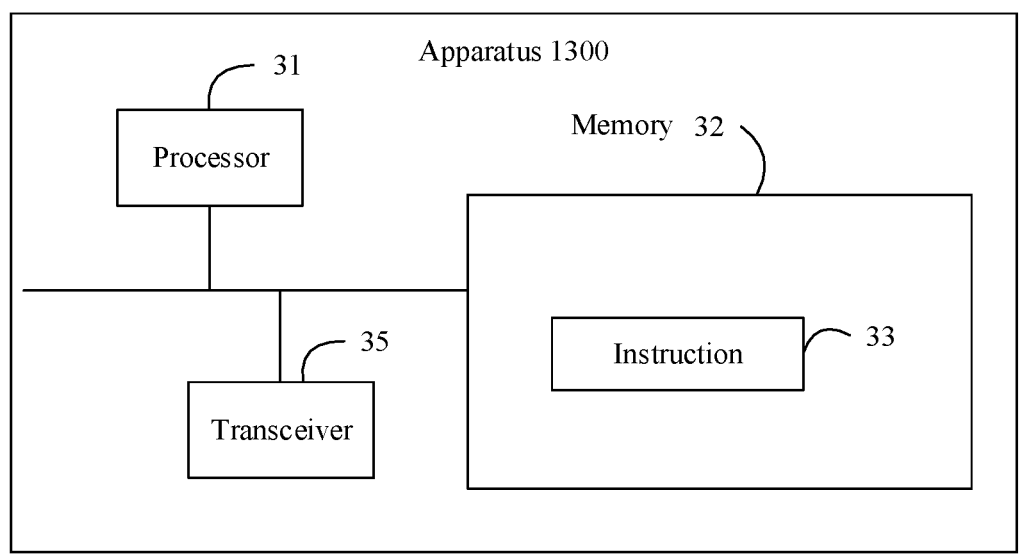
FIG. 19 is a schematic block diagram of an apparatus for processing a change in a radio capability of a terminal apparatus according to an embodiment of this application.

FIG. 19 is a schematic structural diagram of an apparatus for processing a change in a radio capability of a terminal apparatus. The apparatus 1300 may be configured to implement the method corresponding to the access network apparatus described in the foregoing method embodiments, or may be configured to implement the method corresponding to the terminal apparatus described in the foregoing method embodiments. For details, refer to the description in the foregoing method embodiments.

The apparatus 1300 may include one or more processors 31. The processor 31 may also be referred to as a processing unit, and may implement a control function. The processor 31 may be a general purpose processor, a dedicated processor, or the like.

In a possible design, a memory 32 may store an instruction 33. The instruction 33 may be run by the processor 31, so that the apparatus 1300 performs the method that corresponds to the access network apparatus or the terminal apparatus and that is described in the foregoing method embodiments.

In another possible design, the apparatus 1300 may include a circuit. The circuit may implement the sending, receiving, or communication function in the foregoing method embodiments.

Optionally, the communications apparatus 1300 may include one or more memories 32. The memory stores the instruction 33 or intermediate data. The instruction 33 may be run on the processor 31, so that the apparatus 1300 performs the method performed by the access network apparatus or the terminal apparatus in the foregoing embodiments. Optionally, the memory may further store other related data. Optionally, the processor may also store an instruction and/or data. The processor and the memory may be disposed separately, or may be integrated together.

Optionally, the apparatus 1300 may further include a transceiver 35. The processor 31 may be referred to as a processing unit. The transceiver 35 may be referred to as a transceiver unit, a transceiver machine, a transceiver circuit, a transceiver, or the like, and is configured to implement a transceiving function of the apparatus.

In a design, an apparatus (for example, an integrated circuit, a wireless device, a circuit module, a network device, or a terminal device) may include a processor and a transceiver. When the apparatus is configured to implement the step or operation of the access network apparatus in the embodiments shown in FIG. 10 to FIG. 12, for example, the transceiver 35 may receive indication information, where the access network apparatus stores radio capability information of a terminal apparatus, and the indication information is used to indicate that a radio capability of the terminal apparatus changes, or is used to request a current radio capability of the terminal apparatus from the access network apparatus.

The processor 31 is configured to obtain radio capability information of the terminal apparatus according to the indication information.

Optionally, the transceiver 35 is further configured to receive a first message sent by the terminal apparatus, where the first message is used to request to resume a radio resource control connection, and the first message includes the indication information.

Optionally, the transceiver 35 is further configured to receive a second message sent by the terminal apparatus, where the second message is used to indicate that radio resource control connection resume is completed, and the second message includes the indication information.

Optionally, the transceiver 35 is further configured to receive a third message sent by the terminal apparatus, where the third message is used to indicate that radio resource control connection resume is established, and the third message includes the indication information.

Optionally, when the indication information is used to request the current radio capability of the terminal apparatus from the access network apparatus, the transceiver 35 is further configured to receive the indication information sent by the core network apparatus, where the indication information is used to indicate that the radio capability of the terminal apparatus changes. The processor 31 is further configured to update, according to the indication information, the radio capability information stored in the access network apparatus.

Optionally, the processor 31 is further configured to receive an update indication, where the update indication is used to instruct the access network apparatus to update the radio capability information of the terminal apparatus, and the indication information is sent by the core network apparatus.

Optionally, the processor 31 is further configured to delete the radio capability information of the terminal apparatus that is stored before the processor obtains the radio capability information from the terminal apparatus.

Optionally, the radio capability includes at least one of system information or a transceiving capability supported by the terminal apparatus.

Optionally, the processor 31 is further configured to: send, by using the transceiver 35, a radio capability request message to the terminal apparatus according to the indication information, and update the radio capability information of the terminal apparatus based on a second radio capability. The second radio capability is the current radio capability of the terminal apparatus.

Optionally, the processor 31 is further configured to: send, by using the transceiver 35, a radio capability request message to the terminal apparatus according to the indication information, and delete the first radio capability information based on a second radio capability. The second radio capability is the current radio capability of the terminal apparatus.

Optionally, the terminal apparatus is in a radio resource suspend state or a radio resource inactive state.

In a design, an apparatus (for example, an integrated circuit, a wireless device, a circuit module, a network device, or a terminal device) may include a processor and a transceiver. When the apparatus is configured to implement the step or operation of the access network apparatus in FIG. 13 or the first access network apparatus in FIG. 15, for example, the transceiver 35 may receive radio resource resume identification information, and the apparatus stores radio capability information of the terminal apparatus.

The processor 31 is configured to process a context of the terminal apparatus in the access network apparatus based on the identification information.

Optionally, the processor 31 is further configured to: delete the radio capability stored before the radio capability is requested from the terminal apparatus; or send, by using the transceiver 35, an indication message, where the indication message is used to instruct a second access network apparatus to delete the context of the terminal apparatus, and the second access network apparatus is an access network apparatus accessed by the terminal apparatus when the terminal apparatus enters a suspend state.

Optionally, the transceiver 35 is further configured to receive a third message sent by the terminal apparatus, where the third message is used to indicate that radio resource control connection resume establishment is completed, and the third message includes the indication information.

Optionally, the processor 31 sends a radio capability request of the UE to the terminal apparatus according to the indication information by using the transceiver 35; and the transceiver 35 receives the radio capability of the UE that is reported by the access network apparatus.

In a design, an apparatus (for example, an integrated circuit, a wireless device, a circuit module, a network device, or a terminal device) may include a processor and a transceiver. When the apparatus is configured to implement the step or operation of the terminal apparatus in FIG. 10 to FIG. 12, for example, the transceiver 35 may send indication information to an access network apparatus. The indication information is used to indicate that a radio capability of the terminal apparatus changes, or is used to instruct the access network apparatus to update radio capability information of the terminal apparatus.

It should be understood that the apparatus may further generate the indication information or determine the indication information by using the processor 31.

Optionally, the transceiver 35 is further configured to send a first message to the access network apparatus, where the first message is used to request to resume a radio resource control connection, and the first message includes the indication information.

Optionally, the transceiver 35 is further configured to send a second message to the access network apparatus, where the second message is used to indicate that radio resource control connection resume is completed, and the second message includes the indication information.

Optionally, the transceiver 35 is further configured to send a third message to the access network apparatus, where the third message is used to indicate that a radio resource control connection is established, and the third message includes the indication information.

Optionally, the processor 31 is further configured to resume security of a signaling radio bearer and an access stratum without resuming a data radio bearer.

Optionally, the processor 31 is further configured to receive, by using the transceiver 35, a data radio bearer configuration sent by the access network apparatus; and is further configured to resume security of the data radio bearer based on the data radio bearer configuration.

In a design, an apparatus (for example, an integrated circuit, a wireless device, a circuit module, a network device, or a terminal device) may include a processor and a transceiver. When the apparatus is configured to implement the step or operation of the terminal apparatus in FIG. 13 or FIG. 15, for example, the processor 31 may initiate, by using the transceiver 35, a radio resource control connection establishment message based on that the terminal apparatus is in a suspend state and a radio capability of the terminal apparatus changes, or that the terminal apparatus is in a radio resource control inactive state and a radio capability of the terminal apparatus changes.

Optionally, the processor 31 may trigger, by using a non-access stratum of the apparatus, an access stratum of the apparatus to initiate the radio resource control connection establishment message by using the transceiver 35.

Optionally, the radio resource control connection establishment message includes radio resource resume identification information.

Optionally, the radio resource control connection establishment message further includes indication information, where the indication information is used to indicate that the radio capability of the terminal apparatus changes, or is used to update radio capability information of the terminal apparatus.

In a design, an apparatus (for example, an integrated circuit, a wireless device, a circuit module, a network device, or a terminal device) may include a processor and a transceiver. When the apparatus is configured to implement the step or operation of the core network apparatus in FIG. 12, for example, the transceiver 35 may send indication information to an access network apparatus. The indication information is used to indicate that a radio capability of a terminal apparatus changes, or is used to request a current radio capability of the terminal apparatus from the access network apparatus.

Optionally, the processor 31 is further configured to: when the terminal apparatus is in a connected state, send the indication information to the access network apparatus by using the transceiver 35.

Optionally, when the indication information is used to request the current radio capability of the terminal apparatus from the access network apparatus, the transceiver 35 is further configured to send an update indication to the access network apparatus, where the update indication is used to instruct the access network apparatus to update radio capability information of the terminal apparatus, and the update indication and the indication information are carried in a same message.

Optionally, when the indication information is used to indicate that the radio capability of the terminal apparatus changes, the indication information is further used to instruct the access network apparatus to update the radio capability of the terminal apparatus according to the indication information.

The processor and the transceiver described in this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor and the transceiver may also be manufactured by using various 1C technologies, for example, a complementary metal oxide semiconductor (CMOS), an N-channel metal-oxide-semiconductor (NMOS), a P-channel metal-oxide-semiconductor (PMOS), a bipolar junction transistor (BJT), a bipolar CMOS (BiCMOS), silicon germanium (SiGe), and gallium arsenide (GaAs).

In the foregoing embodiment descriptions, the apparatus 1300 is described by using an access network apparatus or a terminal apparatus as an example, but the apparatus described in this application is not limited to the access network apparatus or the terminal apparatus, and a structure of the apparatus may not be limited by FIG. 19. The apparatus may be an independent device or may be a part of a relatively large device. For example, the device may be:

(1) An independent integrated circuit (IC), a chip, or a chip system or subsystem;

(2) A set having one or more ICs, where optionally, the IC set may also include a storage component configured to store data and/or an instruction;

(3) An ASIC, for example, a modem (MSM);

(4) A module that can be embedded in another device;

(5) A receiver, a terminal, a cellular phone, a wireless device, a hand-held phone, a mobile unit, a network device, or the like; and (6) Others, etc.

In addition, the terms "system" and "network" in this specification may be often used interchangeably in this specification. The term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined based on A. However, it should further be understood that determining B based on A does not mean that B is determined based on only A. B may be alternatively determined based on A and/or other information.

Aspects or features in the embodiments of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to a magnetic storage component (for example, a hard disk, a floppy disk, or a magnetic tape), an optical disc (for example, a compact disc (CD), a digital versatile disc (DVD)), a smart card, and a flash memory component (for example, an erasable programmable read-only memory (EPROM), a card, a stick, or a key drive). In addition, various storage media described in this specification may represent one or more devices and/or other machine readable media that are configured to store information. The term "machine readable media" may include but is not limited to a radio channel and various other media that can store, include, and/or carry an instruction and/or data.

A person of ordinary skill in the art may be aware that, in combination with units and algorithm steps in the examples described in the embodiments disclosed in this specification, the embodiments may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A terminal apparatus comprising at least one processor and a memory coupled to the at least one processor, wherein the memory comprises instructions that, when executed by the at least one processor, cause the terminal apparatus to perform operations comprising:
    initiating a radio resource control connection (RRC) establishment message to a network device, based on the terminal apparatus being in a RRC suspend or inactive state and a change of radio capability of the terminal apparatus having occurred since a last RRC establishment message,
        wherein the RRC establishment message comprises radio resource resume identification information that includes a terminal capability change indication for use by the network device to delete an old context of the terminal apparatus.

2. The apparatus according to claim 1, wherein the operations further comprise: instructing, by a non-access stratum of the terminal apparatus, an access stratum to initiate the radio resource control connection establishment message.

3. The apparatus according to claim 1, wherein the RRC connection establishment message further comprises indication information for indicating a current state of the radio capability of the terminal apparatus or for requesting a current radio capability of the terminal apparatus from the access network apparatus.

4. A method for processing a change in a radio capability of a terminal apparatus, the method comprising:
    initiating, by the terminal apparatus, a radio resource control (RRC) connection establishment message based on the terminal apparatus being in a RRC suspend or inactive state and a change of radio capability to a network device of the terminal apparatus has occurred since a last RRC establishment message,
        wherein the RRC establishment message comprises radio resource resume identification information that includes a terminal capability change indication for use by the network device to delete an old context of the terminal apparatus.

5. The method according to claim 4, wherein initiating the radio resource control connection establishment message comprises instructing, by a non-access stratum of the terminal apparatus, an access stratum to initiate the radio resource control connection establishment message.

6. The method according to claim 4, wherein the RRC connection establishment message further comprises indication information for indicating to the network device a current state of the radio capability of the terminal apparatus, or for requesting a current radio capability of the terminal apparatus from the access network apparatus.

7. A non-transitory computer readable medium storing instructions that, when executed by at least one processor, cause the at least one processor to execute operations comprising:
    initiating a radio resource control connection (RRC) establishment message to a network device, based on a terminal apparatus being in a RRC suspend or inactive state and a change of radio capability of the terminal apparatus having occurred since a last RRC establishment message,
        wherein the RRC establishment message comprises radio resource resume identification information that includes a terminal capability change indication for use by the network device to delete an old context of the terminal apparatus.

8. The non-transitory computer readable medium according to claim 7, wherein the operations further comprise instructing an access stratum to initiate the radio resource control connection establishment message.

9. The non-transitory computer readable medium according to claim 7, wherein the RRC connection establishment message further comprises indication information for indicating to the network device a current state of the radio capability of the terminal apparatus, or for requesting a current radio capability of the terminal apparatus from the access network apparatus.

* * * * *